(12) United States Patent
Sun et al.

(10) Patent No.: US 10,419,594 B2
(45) Date of Patent: Sep. 17, 2019

(54) METHOD FOR OPERATING MOBILE DEVICE HAVING PLURALITY OF CARD MODULES INSTALLED THEREIN AND MOBILE DEVICE THEREFOR

(71) Applicant: SAMSUNG ELECTRONICS CO., LTD., Suwon-si (KR)

(72) Inventors: Guangyu Sun, Beijing (CN); Yuanmo Xu, Beijing (CN); Daqun Guo, Beijing (CN); Wenzhao Zhou, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/060,769

(22) PCT Filed: Dec. 7, 2016

(86) PCT No.: PCT/KR2016/014335
§ 371 (c)(1),
(2) Date: Jun. 8, 2018

(87) PCT Pub. No.: WO2017/099477
PCT Pub. Date: Jun. 15, 2017

(65) Prior Publication Data
US 2018/0375985 A1 Dec. 27, 2018

(30) Foreign Application Priority Data

Dec. 8, 2015 (CN) .......................... 2015 1 0901171
Dec. 7, 2016 (KR) ........................ 10-2016-0166181

(51) Int. Cl.
*G06Q 20/20* (2012.01)
*G06Q 20/22* (2012.01)
(Continued)

(52) U.S. Cl.
CPC .......... *H04M 1/7253* (2013.01); *G01C 21/34* (2013.01); *G06Q 20/202* (2013.01);
(Continued)

(58) Field of Classification Search
CPC ......... G06K 19/00; G06Q 20/20; G07B 15/00
(Continued)

(56) References Cited

U.S. PATENT DOCUMENTS 8,123,128 B1  2/2012 Zhu
8,261,353 B2  9/2012 Hirsave et al.
(Continued)

FOREIGN PATENT DOCUMENTS

JP  2015-69517 A  4/2015
KR  10-2010-0133805 A  12/2010
(Continued)

OTHER PUBLICATIONS

International Search Report (PCT/ISA/210) and Written Opinion (PCT/ISA/237) dated Feb. 27, 2017 issued by the International Searching Authority in International Application No. PCT/KR2016/014335.

(Continued)

*Primary Examiner* — Edwyn Labaze
(74) *Attorney, Agent, or Firm* — Sughrue Mion, PLLC

(57) ABSTRACT

Provided is a method of operating a mobile device. The method includes: extracting at least one of card modules installed in the mobile device, based on a location of the mobile device; obtaining information regarding at least one external device that interacts with the at least one card module; and providing a user interface including the information regarding the at least one external device that interacts with the at least one card module.

20 Claims, 30 Drawing Sheets

(51) Int. Cl.
  *G06Q 20/40* (2012.01)
  *G06Q 20/36* (2012.01)
  *G06Q 20/32* (2012.01)
  *G06Q 20/34* (2012.01)
  *H04M 1/725* (2006.01)
  *G01C 21/34* (2006.01)
  *G06Q 20/38* (2012.01)
  *H04W 4/029* (2018.01)
  *H04W 4/021* (2018.01)

(52) U.S. Cl.
  CPC ........... *G06Q 20/227* (2013.01); *G06Q 20/32* (2013.01); *G06Q 20/3221* (2013.01); *G06Q 20/3223* (2013.01); *G06Q 20/3224* (2013.01); *G06Q 20/3278* (2013.01); *G06Q 20/34* (2013.01); *G06Q 20/3672* (2013.01); *G06Q 20/389* (2013.01); *G06Q 20/405* (2013.01); *H04M 1/725* (2013.01); *H04W 4/021* (2013.01); *H04W 4/029* (2018.02)

(58) Field of Classification Search
  USPC ......................................... 235/380, 375, 487
  See application file for complete search history.

(56) References Cited

U.S. PATENT DOCUMENTS

| | | | | |
|---|---|---|---|---|
| 2004/0098715 A1* | 5/2004 | Aghera | .................... | G06F 8/65 717/173 |
| 2009/0037326 A1 | 2/2009 | Chitti et al. | | |
| 2012/0123935 A1* | 5/2012 | Brudnicki | .............. | G06Q 20/20 705/41 |
| 2013/0178233 A1 | 7/2013 | McCoy et al. | | |
| 2013/0212007 A1* | 8/2013 | Mattsson | ............. | G06Q 20/405 705/39 |
| 2014/0058860 A1 | 2/2014 | Roh et al. | | |
| 2014/0081720 A1* | 3/2014 | Wu | ........................ | G06Q 20/20 705/14.1 |
| 2014/0099938 A1* | 4/2014 | Calo | .................. | G06F 17/30327 455/422.1 |
| 2014/0129441 A1* | 5/2014 | Blanco | ................. | G06Q 20/322 705/44 |
| 2015/0073980 A1 | 3/2015 | Griffin et al. | | |
| 2015/0120472 A1* | 4/2015 | Aabye | .................... | G06Q 20/36 705/16 |
| 2015/0254465 A1 | 9/2015 | Ekberg et al. | | |
| 2015/0287022 A1 | 10/2015 | Granbery | | |
| 2016/0028550 A1* | 1/2016 | Gaddam | ............... | H04L 9/3263 713/173 |
| 2016/0148197 A1* | 5/2016 | Dimmick | ........... | G06Q 20/3674 705/67 |
| 2016/0192123 A1* | 6/2016 | Lim | ..................... | G06Q 20/202 455/41.1 |
| 2017/0270557 A1* | 9/2017 | Maenpaa | ........... | G06Q 30/0233 |
| 2017/0373852 A1* | 12/2017 | Cassin | ................... | G06Q 20/14 |
| 2018/0053180 A1* | 2/2018 | Cho | ..................... | G06Q 20/353 |
| 2018/0315038 A1* | 11/2018 | Rezayee | ............... | H04W 76/10 |

FOREIGN PATENT DOCUMENTS

| | | |
|---|---|---|
| KR | 10-2014-0105663 A | 9/2014 |
| KR | 10-2015-0101600 A | 9/2015 |
| KR | 10-2015-0132702 A | 11/2015 |

OTHER PUBLICATIONS

Communication dated Aug. 14, 2018 issued by the European Patent Office in European Counterpart Application No. 16873342.6.
Communication dated Jul. 18, 2019 issued by the European Patent Office in counterpart European Application No. 16873342.6.

\* cited by examiner

FIG. 6

< INTERACTION HISTORY (600) >

| TIME INFORMATION | GPS INFORMATION | CARD MODULE | EXTERNAL DEVICE |
|---|---|---|---|
| 15/01/05 1:00PM | {46.56M, 117 49.59W, 268} | FIRST CARD MODULE | X1 {POS TERMINAL;IMMOBILITY;0.3m50Hz;...} |
| 15/01/05 1:00PM | {46.56M, 117 49.59W, 268} | SECOND CARD MODULE | C2 {TRANSPORTATION TERMINAL;IMMOBILITY;0.2m;...} |
| 15/01/05 1:00PM | | THIRD CARD MODULE | A3 {ATM기기; IMMOBILITY, 0.1M;...} |
| ... | ... | ... | ... |

FIG. 9

<TIME-INTERVAL INTERACTION HISTORY (900)>

| | TIME | LOCATION | CARD MODULE |
|---|---|---|---|
| AM | 0:00 ~ 2:00 | A CONVENIENCE STORE | FIRST CARD MODULE |
| | 2:00 ~ 4:00 | – | – |
| | 4:00 ~ 6:00 | – | – |
| | 6:00 ~ 8:00 | X SUBWAY STATION, Y BUS STOP, | SECOND CARD MODULE, THIRD CARD MODULE |
| | 8:00 ~ 10:00 | Z COMPANY, A CONVENIENCE STORE | FOURTH CARD MODULE, FIRST CARD MODULE |
| | 10:00 ~ 12:00 | – | – |
| PM | 12:00 ~ 14:00 | C RESTAURANT | FIRST CARD MODULE |
| | 14:00 ~ 16:00 | – | – |
| | 16:00 ~ 18:00 | – | – |
| | 18:00 ~ 20:00 | X SUBWAY STATION, Y BUS STOP, | SECOND CARD MODULE |
| | 20:00 ~ 22:00 | B MART | FIRST CARD MODULE |
| | 22:00 ~ 24:00 | – | – |

METHOD FOR OPERATING MOBILE DEVICE HAVING PLURALITY OF CARD MODULES INSTALLED THEREIN AND MOBILE DEVICE THEREFOR

TECHNICAL FIELD

The present disclosure relates to a method of operating a mobile device in which card modules are installed, and the mobile device.

BACKGROUND ART

Recent non-contact cards included in mobile devices are implemented by combining radio frequency identification (RFID) technology with integrated circuit (IC) card technology and are groundbreaking in the field of electronic devices. When the non-contact cards are within a certain distance from card readers, the non-contact cards may receive/transmit data from/to the card readers through wireless communication.

DESCRIPTION OF EMBODIMENTS

Solution to Problem

One or more embodiments are intended to improve user experience by providing a user interface that provides information regarding a card reader by obtaining information regarding at least one card reader capable of interacting with at least one of card modules installed in a mobile device.

Also, one or more embodiments are intended to improve availability of a memory of a mobile device by optimizing patch data of a card module installed in the mobile device.

Advantageous Effects of Disclosure

According to a first aspect of the present disclosure, there is provided a method of operating a mobile device, the method including: extracting at least one card module from a plurality of card modules installed in the mobile device, based on a location of the mobile device; obtaining information regarding at least one external device that interacts with the at least one card module; and providing a user interface including the information regarding the at least one external device that interacts with the at least one card module.

The providing of the user interface may include, when interaction between the at least one card module and the at least one external device fails, changing the information provided through the user interface.

When information regarding a plurality of external devices capable of interacting with the at least one card module is obtained, the providing of the user interface may include: selecting an external device from the plurality of external devices by comparing pieces of information respectively regarding the plurality of external devices; and providing a user interface including information regarding the selected external device.

The extracting of the at least one card module may include: obtaining patch data regarding the at least one card module; and executing a patch operation by using some pieces of the patch data, based on the location of the mobile device.

The extracting of the at least one card module may further include cancelling a previous patch operation by comparing the location of the mobile device with a location where the previous patch operation was executed.

The obtaining of the information regarding the at least one external device may include: predicting a movement path of the mobile device based on the location of the mobile device; and obtaining the information regarding the at least one external device from the at least one external device around the movement path.

The predicting of the movement path of the mobile device may include: determining a point of interest (POI) of the mobile device based on the information regarding the at least one external device; and determining a movement path from the location of the mobile device to the closest POI.

When the plurality of card modules are extracted, the providing of the user interface may include: determining an amount paid by using each of the plurality of card modules, based on at least one of credit limits, accumulated billing amounts, a number of uses, and balances of the plurality of card modules; and providing a user interface for displaying an amount paid by using each of the plurality of card modules.

The information regarding the at least one external device may include at least one of identification information, type information, communication strength information, and location information of the at least one external device.

When interaction between the at least one card module and the at least one external device is performed, information regarding the interaction may be transmitted to another mobile device connected to the mobile device.

According to a second aspect of the present disclosure, there is provided a mobile device including: a memory storing a plurality of card modules; a controller configured to extract at least one card module from the plurality of card modules, based on a location of the mobile device; and a communication unit configured to obtain information regarding at least one external device interacting with the at least one card module. The controller is further configured to provide a user interface including the information regarding the at least one external device interacting with the at least one card module.

According to a third aspect of the present disclosure, there is provided a non-transitory computer-readable recording medium having recorded thereon a program for implementing the method.

BRIEF DESCRIPTION OF DRAWINGS

FIG. 6 illustrates an example of interaction history information managed by a mobile device.

FIG. 9 illustrates another method whereby a mobile device predicts a movement path of the mobile device, according to an embodiment.

BEST MODE

Figure 1:
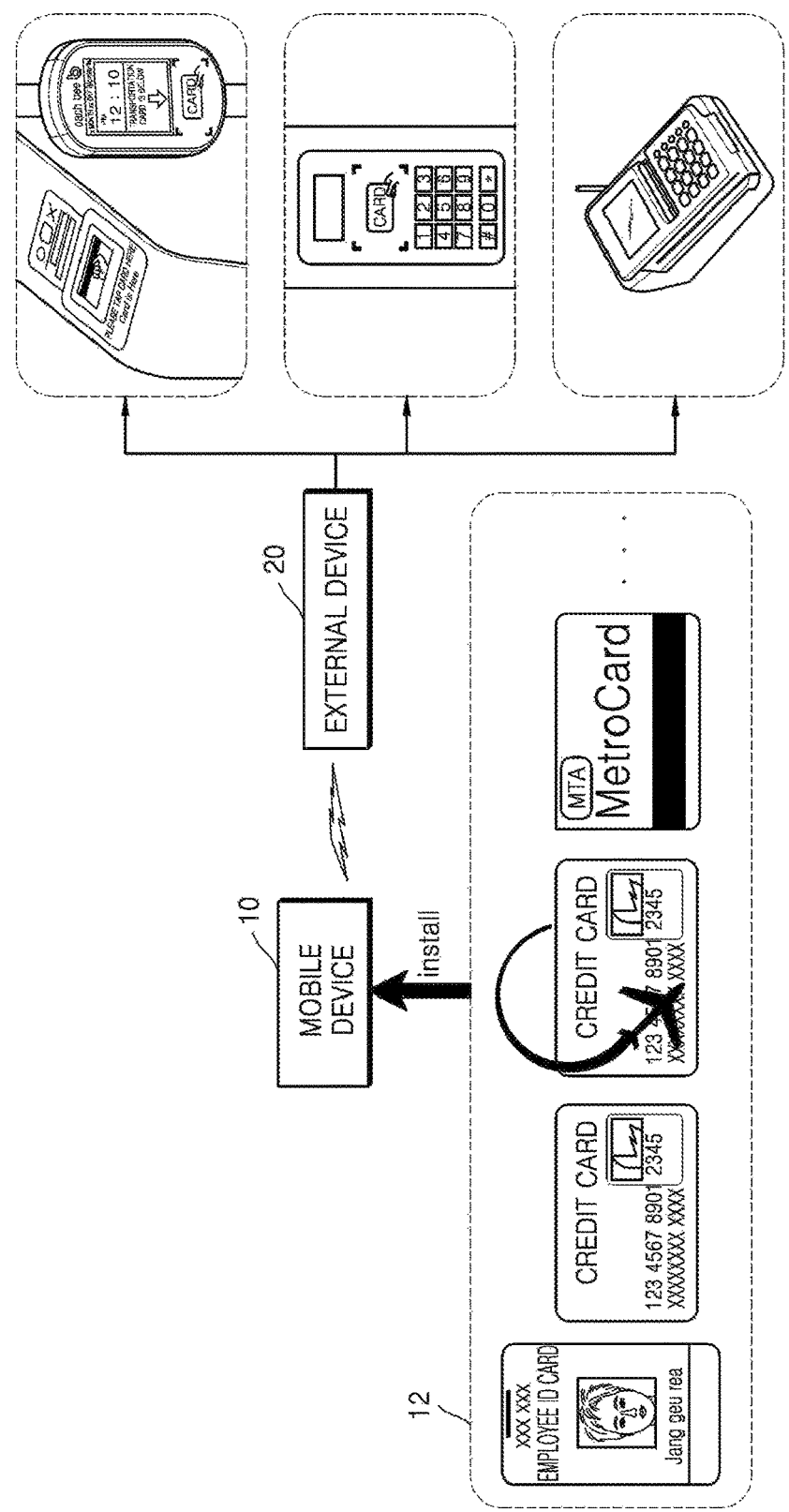
FIG. 1 is a schematic view of a method of operating a mobile device, according to an embodiment.

The terms used in the present specification will be briefly described, and then the present disclosure will be described in detail.

The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

It will be understood that although the terms first and second are used herein to describe various elements, these elements should not be limited by these terms. These terms are only used to distinguish one element from another element. For example, a first element discussed below could be termed a second element, and similarly, a second element may be termed a first element without departing from the teachings of this disclosure. As used herein, the term "and/ or" includes any and all combinations of one or more of the associated listed items.

Throughout the specification, when a portion "includes" an element, another element may be further included, rather than excluding the existence of the other element, unless otherwise described. Also, the term "unit" is a software component or a hardware component such as a field-programmable gate array (FPGA) or an application specific integrated circuit (ASIC) and performs a certain function. However, the "unit" is not limited to software or hardware. The "unit" may be configured to be included in a storage medium on which addressing may be performed or may be configured to execute one or more processors. For example, the "unit" includes components (e.g., software components, object-oriented software components, class components, and task components), processes, functions, attributes, procedures, sub-routines, segments of program codes, drivers, firmware, micro codes, circuits, data, database, data structures, tables, arrays, and variables. Components and functions provided in the "units" may be combined into a smaller number of components and "units" or separated into additional components and "units".

One or more embodiments of the disclosure will be clearly described in detail with reference to the attached drawings so that one of ordinary skill in the art to which the present disclosure pertains may easily practice the disclosure. The present disclosure may, however, be embodied in many different forms and should not be construed as being limited to the embodiments set forth herein. In addition, portions that are irrelevant to the descriptions of the disclosure will be omitted for clarity, and like reference numerals in the drawings denote like elements.

FIG. 1 is a schematic view of a method of operating a mobile device 10, according to an embodiment.

Referring to FIG. 1, the mobile device 10 may communicate with an external device 20 by using card modules 12 installed in the mobile device 10.

The mobile device 10 may receive a service such as settlement of securities, payment, identification and authentication, or the like by using at least one of the card modules 12 installed in the mobile device 10. The card module 12 may be software stored in a memory of the mobile device 10. The card modules 12 may include, for example, a transportation card module for paying transportation fees, a credit card module for sending and receiving stocks and payments, an ID card module for identification and authentication, an employee (or a student) card module, and the like.

According to an embodiment, the mobile device 10 may manage the card modules 12. For example, the mobile device 10 may execute patch operations regarding the card modules 12 based on location information of the mobile device 10. Also, the mobile device 10 may identify at least one external device 20 in a vicinity of the mobile device 10 and may select at least one card module 12 that interacts with the external device 20. The interaction of the card module 12 with the external device 20 may indicate that the card module 12 performs data communication with the external device 20 in a non-contact state by using a wireless communication device included in the mobile device 10.

According to an embodiment, the mobile device 10 may provide a user interface (UI) including information regarding the external device 20 that interacts with the at least one selected card module 12. The UI may include visual, auditory, and/or sensory data output from the mobile device 10 to receive a control signal from a user. For example, the mobile device 10 may compare installation times of the external devices 20 and may provide a UI including recommendation information used to recommend an external device 20 having the shortest installation time among the external devices 20. Also, the mobile device 10 may provide a UI including a point of interest (POI) information of the user, based on information regarding previous interaction with the external devices 20.

The mobile device 10 may include a smart phone, a tablet personal computer (PC), a PC, a smart television (TV), a mobile phone, a personal digital assistant (PDA), a laptop, a media player, a micro server, a global positioning system (GPS) device, an e-book reader, a digital broadcast terminal, a navigation device, a kiosk, an MP3 player, a digital camera, home appliances, or the like. However, the mobile device 10 is not limited thereto. The mobile device 10 may include wearable devices, for example, a watch, glasses, a hair band, a ring, and the like, which have communication and data processing functions.

The external device 20 is a card reader capable of receiving/transmitting data from/to the card modules 12 installed in the mobile device 10. Thus, the external device 20 may communicate with the mobile device 10 via a wireless network such as a local area network (LAN) or a mobile communication network. For example, the external device 20 may communicate with the mobile device 10 via Bluetooth, Bluetooth Low Energy (BLE), ZigBee, Wi-Fi Direct (WFD), ultra-wideband (UWB), Infrared Data Association (IrDA), Near Field Communication (NFC), or the like.

The external device 20 may transmit the data received from the mobile device 10 to a cloud server, a web server, or a data server and may receive a result value. The external device 20 may execute an operation such as a payment information output, a payment error information output, or unlocking a door lock, based on the received result value.

The external device 20 may include a point of sale (POS) terminal, a bus card terminal, a subway card terminal, a gate check terminal, a security device, an automatic teller machine (ATM), a cash dispenser, or the like.

Figure 2:
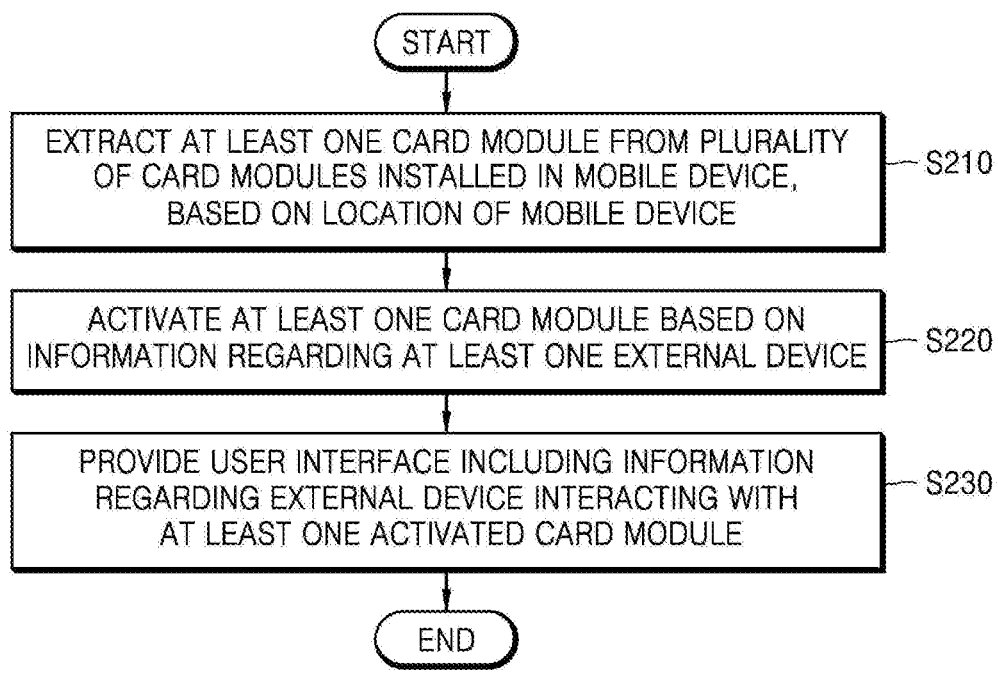
FIG. 2 is a flowchart of a method of operating a mobile device, according to an embodiment.

FIG. 2 is a flowchart of a method of operating the mobile device 10, according to an embodiment.

Referring to FIG. 2, in operation S210, the mobile device 10 may extract at least one of card modules installed in the mobile device 10, based on a location of the mobile device 10.

According to an embodiment, the mobile device 10 may determine the location of the mobile device 10. For example, the mobile device 10 may obtain GPS location information from a GPS device included in the mobile device 10. Also, the mobile device 10 may use cell information (e.g., a cell ID) of the mobile device 10 that is obtained via a network and may determine an address (e.g., a country, a city, a location, etc.) where the mobile device 10 is located. In addition, the mobile device 10 may determine the location of the mobile device 10 based on a Wi-Fi hotspot ID, an IP address, and the like. Moreover, the mobile device 10 may provide a UI for determining the location of the mobile device 10.

According to an embodiment, the mobile device 10 may extract at least one of the card modules, according to the location of the mobile device 10. For example, when the location of the mobile device 10 indicates a bank, the mobile device 10 may extract a bank card module, an ID card module, or the like. Also, when the location of the mobile device 10 indicates a company where the user works, the mobile device 10 may extract an employee card module.

The mobile device 10 may extract at least one card module according to the location and a previous interaction history of the mobile device 10. For example, the previous interaction history may include a point in time when interaction occurs on the mobile device 10, a card module that performs the interaction, information regarding an external device, and the like. For example, the mobile device 10 may retrieve a history of interaction occurring at a current location and may select at least one card module corresponding to the retrieved history.

According to an embodiment, the mobile device 10 may execute a patch operation regarding the extracted card module. In this case, the mobile device 10 may execute the patch operation by using only some pieces of patch data, based on the location of the mobile device 10. A method whereby the mobile device 10 executes the patch operation based on the location information of the mobile device 10 will be described below in detail with reference to FIGS. 16 to 21.

In operation S210, when the mobile device 10 is not able to extract at least one of the card modules according to the location of the mobile device 10, the mobile device 10 may provide a UI for installing a new card module. For example, when the user of the mobile device 10 is in other countries, the mobile device 10 may provide a UI for installing a card module that may be used in other countries, according to the location of the mobile device 10.

In operation S220, the mobile device 10 obtains information regarding at least one external device capable of interacting with the at least one card module. The information regarding the at least one external device may include identification information, a type, a location, a height, a communication type, a communicable range, communication strength, etc. of the external device.

According to an embodiment, the mobile device 10 may obtain information provided by the external device 20 (e.g., information broadcasted from the external device 20) or information regarding the external device 20 from an external server (e.g., a cloud server, a web server, etc.), based on a type of the extracted card module. For example, when the extracted card module is a credit card module or a bank card module, the mobile device 10 may obtain information regarding a POS terminal. Also, when the extracted card module is an ID card module, the mobile device 10 may obtain information regarding an ID card terminal.

Based on the location of the mobile device 10, the mobile device 10 may obtain information regarding an external device located within a certain range (e.g., within 1 meter, 0.5 meters, etc.) from the mobile device 10. Alternatively, the mobile device 10 may predict a next location of the mobile device 10 and may obtain information regarding an external device located around a movement path of the mobile device 10 from the current location to the next location. A method whereby the mobile device 10 obtains the information regarding the external device around the movement path will be described in detail with reference to FIGS. 7 to 9.

The mobile device 10 may analyze the previous interaction history and may obtain the information regarding the external device capable of interacting with the at least one extracted card module.

In operation S230, the mobile device 10 may provide a UI including the information regarding the external device interacting with the at least one extracted card module. For example, based on a type of the external device 20, the mobile device 10 may provide a UI including a user guide for guiding a method of interacting with the external device 20. Also, for stable interaction with the external device 20, the mobile device 10 may provide a UI including a user guide for guiding the mobile device 10 to a location closer to a location and a height of the external device 20.

According to an embodiment, when pieces of information regarding multiple external devices are received, the mobile device 10 may select one external device 20 by comparing the pieces of information with each other. Also, the mobile device 10 may provide a UI including information regarding the selected external device 20. For example, the mobile device 10 may compare communicable ranges of the external devices and may select one external device 20 having the longest communicable range, thereby providing a UI indicating the selected external device 20. Alternatively, the mobile device 10 may compare identification information of the external devices and may provide a UI indicating the external device 20 having the shortest installation time. The mobile device 10 may recommend an external device 20 that is the most appropriate for the user by using the UI and may induce the user to interact with the mobile device 10 by using the recommended external device 20.

When the card modules are extracted in operation S210, the mobile device 10 may provide UIs that classify and indicate information regarding the external devices capable of respectively interacting with the card modules. In this case, in response to a user input of selecting one of the extracted card modules, the mobile device 10 may perform interaction between the selected card module and the external device 20.

Alternatively, the mobile device 10 may interact with the external device by using the card modules. For example, the mobile device 10 may divide payments and may allow the card modules to interact with the external device 20 based on the divided payments. In this case, the mobile device 10 may provide a UI including information regarding each card module and the divided payments.

Alternatively, the mobile device 10 may assign priorities to the card modules and may provide a UI including information regarding an external device that interacts with a card module having the highest priority. In this case, the mobile device 10 may determine the priorities based on an interaction frequency of each card module, recent interaction histories, user inputs, and the like.

According to an embodiment, the mobile device 10 may change information provided through the UI according to a result of the interaction between the extracted card module and the external device 20. For example, when the interaction succeeds, the mobile device 10 may provide a UI including interaction details (e.g., billing amounts, transportation fees, a cash card balance, bank deposits, a cash card balance, an e-cash balance, checking an ID, etc.). Also, when the interaction fails, the mobile device 10 may change the information provided through the UI. For example, the mobile device 10 may provide a user guide for guiding a method of interaction between a card module and the external device 20. Alternatively, when the interaction fails, the mobile device 10 may provide a user guide for guiding in detail the mobile device 10 to the current location close to the location and the height of the external device 20.

Alternatively, when the number of times that interaction fails, the mobile device 10 may change the information provided through the UI. For example, when an $N^{th}$ interaction between the card module and the external device 20 fails, the mobile device 10 may provide a UI including a user guide for guiding in detail the mobile device 10 to the current location closer to the location and the height of the external device 20, and when an $M^{th}$ interaction fails, the mobile device 10 may provide a UI including information regarding another card module or another external device to guide the mobile device 10 to use the other card module or the other external device.

According to an embodiment, the mobile device 10 may determine the information provided through the UI according to a result of comparing each piece of information regarding the external device with a threshold value. For example, when communication signal strength of the external device 20 is less than the threshold value, the mobile device 10 may provide a UI indicating the communication signal strength of the external device 20. Otherwise, when the communication signal strength of the external device 20 is greater than the threshold value, the mobile device 10 may provide a UI including other information.

The mobile device 10 may provide a UI including at least one of a credit limit, accumulated billing amounts, the number of uses, and a balance of the extracted card module. Also, when the extracted card module is the cash card module, the mobile device 10 may further provide a UI that recharges the cash card module. In this case, the UI may provide a method of recharging the cash card module.

Figure 3:
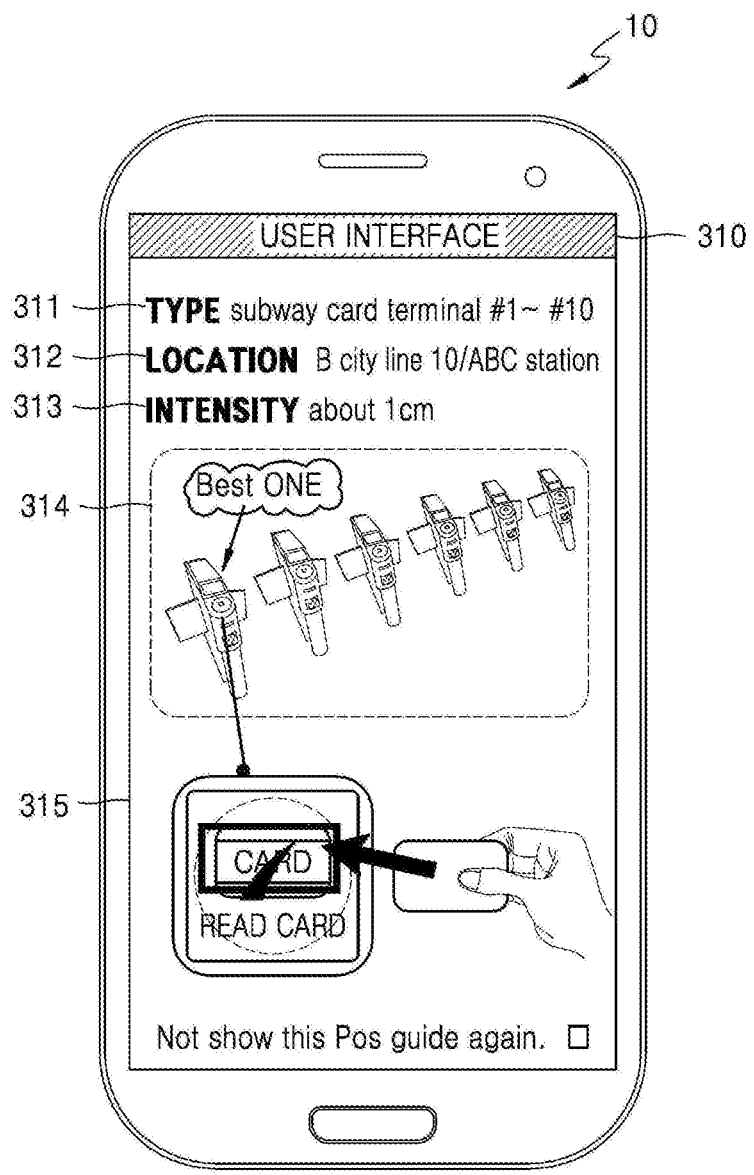
FIG. 3 illustrates an example of a user interface including information regarding an external device.

FIG. 3 illustrates an example of a UI 310 including information regarding an external device.

Referring to FIG. 3, the mobile device 10 may extract a subway card module according to a location (e.g., a subway station) of the mobile device 10 and may provide a UI 310 including information regarding a subway card terminal that may interact with the subway card module. For example, the UI 310 may include a graphical user interface (GUI) indicating information 311 regarding a type of the subway card terminal, location information 312, communicable distance information 313, and the like.

According to an embodiment, when the mobile device 10 obtains information regarding subway card modules (e.g., first to tenth subway card terminals), the mobile device 10 may compare identification information of the subway card modules. Also, based on comparison results, the mobile device 10 may provide the UI 310 that further includes a GUI 314 indicating an external device (e.g., the tenth subway card terminal) that is the most recently installed.

In addition, the UI 310 may include images of the subway card terminals. In this case, the images of the subway card terminals may be obtained by an imaging device (e.g., a camera) included in the mobile device 10. However, one or more embodiments are not limited thereto. For example, the images of the subway card terminals may be obtained by an external server (e.g., a cloud server, a web server, etc.) or via the Internet.

Moreover, for stable interaction between the subway card module and the subway card terminal, the mobile device 10 may provide the UI 310 that further includes a user guide 315 for guiding the mobile device 10 to the location closer to a location and a height of the subway card terminal.

Figure 4:
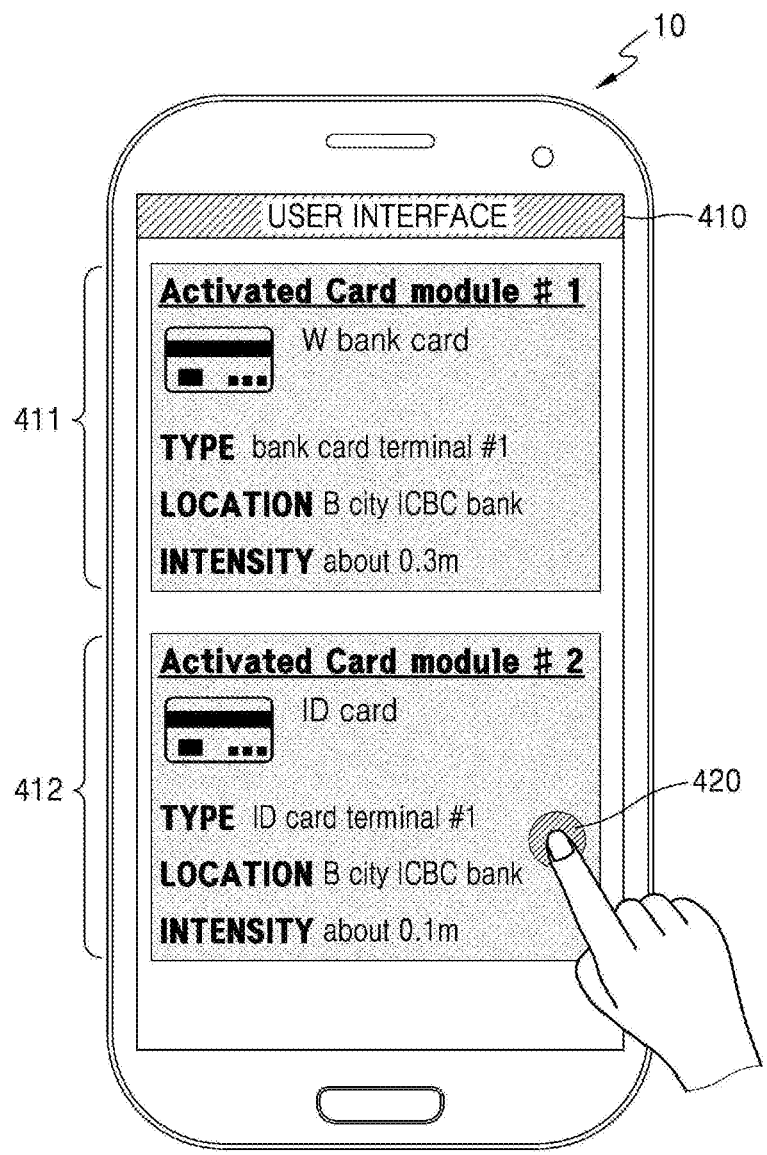
FIG. 4 illustrates another example of a user interface including information regarding an external device.

FIG. 4 illustrates another example of a UI 410 including information regarding an external device.

Referring to FIG. 4, the mobile device 10 may extract a W bank card module and an ID card module according to a location (e.g., W bank) of the mobile device 10 and may provide a UI 410 distinguishing and indicating information 411 and information 412 regarding external devices that respectively interact with card modules.

Also, the mobile device 10 may perform interaction between the ID card module and an 'ID card terminal #1', in response to a user input 420 (e.g., a touch input) received in a screen area indicating the information 412 regarding the external device that interacts with the ID card module.

Figure 5:
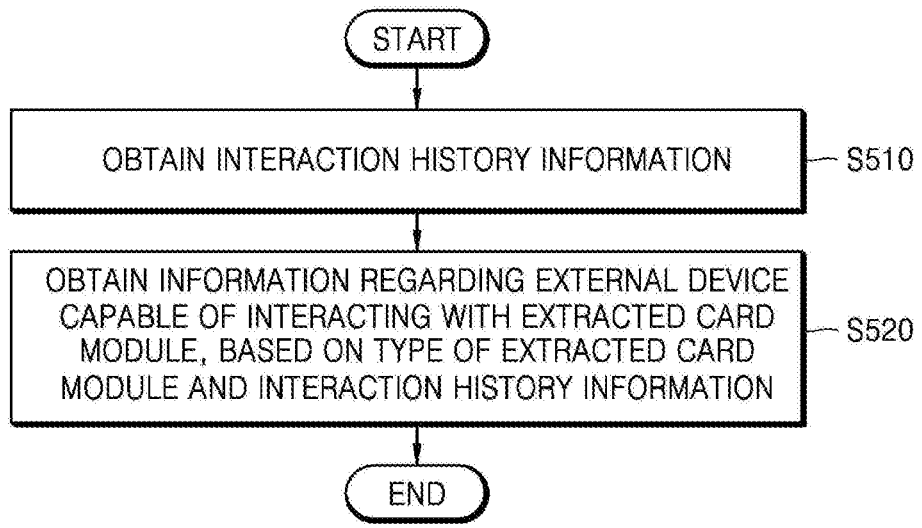
FIG. 5 is a flowchart of a method whereby a mobile device extracts a card module from extracted card modules, according to an embodiment.

FIG. 5 is a flowchart of a method whereby the mobile device 10 extracts a card module from extracted card modules, according to an embodiment.

Referring to FIG. 5, in operation S510, the mobile device 10 may obtain interaction history information. For example, when interaction between the external device 20 and card modules installed in the mobile device 10 is performed, the mobile device 10 may extract a location where the interaction is performed, identification information of the card module that performs the interaction, information regarding the external device performing the interaction, and the like. Also, the mobile device 10 may store and manage the interaction history information including the extracted information.

FIG. 6 illustrates an example of interaction history information managed by the mobile device 10. Referring to FIG. 6, interaction history information 600 may include a point in time when interaction between a card module installed in the mobile device 10 and the external device 20 is performed, a location where the interaction is performed, identification information of the card module, information regarding the external device that performs the interaction, or the like. The information regarding the external device may include an identification value (e.g., X1, C2, etc.), a type (e.g., a POS terminal, a transportation terminal, etc.), mobility (e.g., mobility or immobility), a communicable range (e.g., 0.3 m, etc.), communication strength (e.g., 50 Hz, etc.), etc. of the external device.

In the interaction history information 600 of FIG. 6, the location where the interaction is performed is presented as GPS information. However, one or more embodiments are not limited thereto. For example, the interaction history information 600 may be presented as a name of a store, a company, a subway station, a bus stop, or the like, where the interaction is performed.

It has been described above that the mobile device 10 generates, stores, and manage the interaction history information 600. However, one or more embodiments are not limited thereto. The interaction history information 600 may be provided from an external sever (e.g., a server of a card module provider, etc.).

Referring back to FIG. 5, in operation S520, the mobile device 10 may obtain the information regarding the external device capable of interacting with the extracted card module, based on the interaction history information and the type of the extracted card module.

Figure 7:
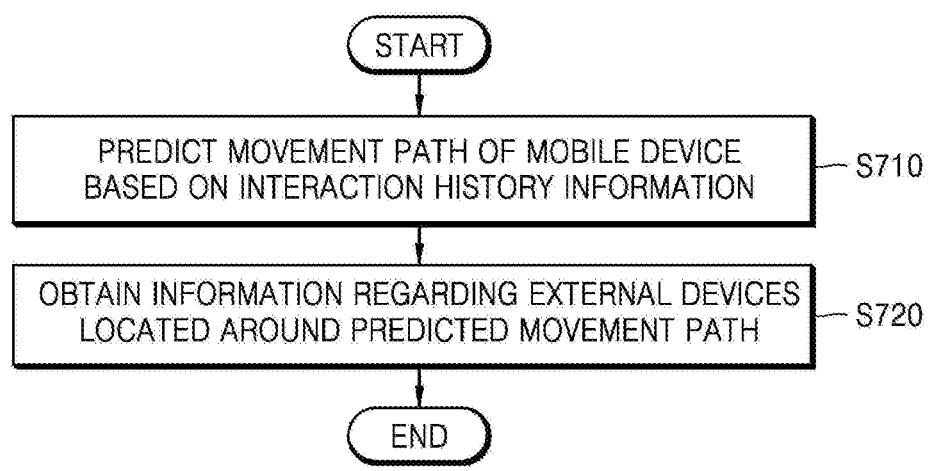
FIG. 7 is a flowchart of another method whereby a mobile device obtains information regarding an external device, according to an embodiment.

FIG. 7 is a flowchart of another method whereby the mobile device 10 obtains information regarding an external device.

Referring to FIG. 7, in operation S710, the mobile device 10 may predict a movement path of the mobile device 10, based on the interaction history information.

According to an embodiment, the mobile device 10 may extract POI information of the user, based on the interaction history information (600 of FIG. 6). For example, the mobile device 10 may calculate an interaction frequency of each external device from the interaction history information 600, and when the interaction frequency of each external device is equal to or greater than a threshold value, a location of a corresponding external device 20 may be designated as a POI.

The mobile device 10 may compare the location of the mobile device 10 with the extracted POI information and may predict the movement path of the mobile device 10. For example, POI information regarding a POI that is the closest to a current location of the mobile device 10 may be determined as a next location. Alternatively, the mobile device 10 may provide a UI including the POI information and thus may receive a user input of selecting a next location of the mobile device 10.

In operation S720, the mobile device 10 may obtain information regarding external devices that are located around the predicted movement path.

For example, the mobile device 10 may obtain, from the external server (e.g., the cloud server, the web server, etc.), the information regarding the external device 20 capable of interacting with the extracted card module, the external device 20 selected from among the external devices located around the movement path of the mobile device 10 from the current location to the next location.

Alternatively, the mobile device 10 may receive POI information of another mobile device that is a friend of the mobile device 10. Based on the POI information of the other mobile device, the mobile device 10 may obtain information regarding at least one external device 20.

Figure 8:
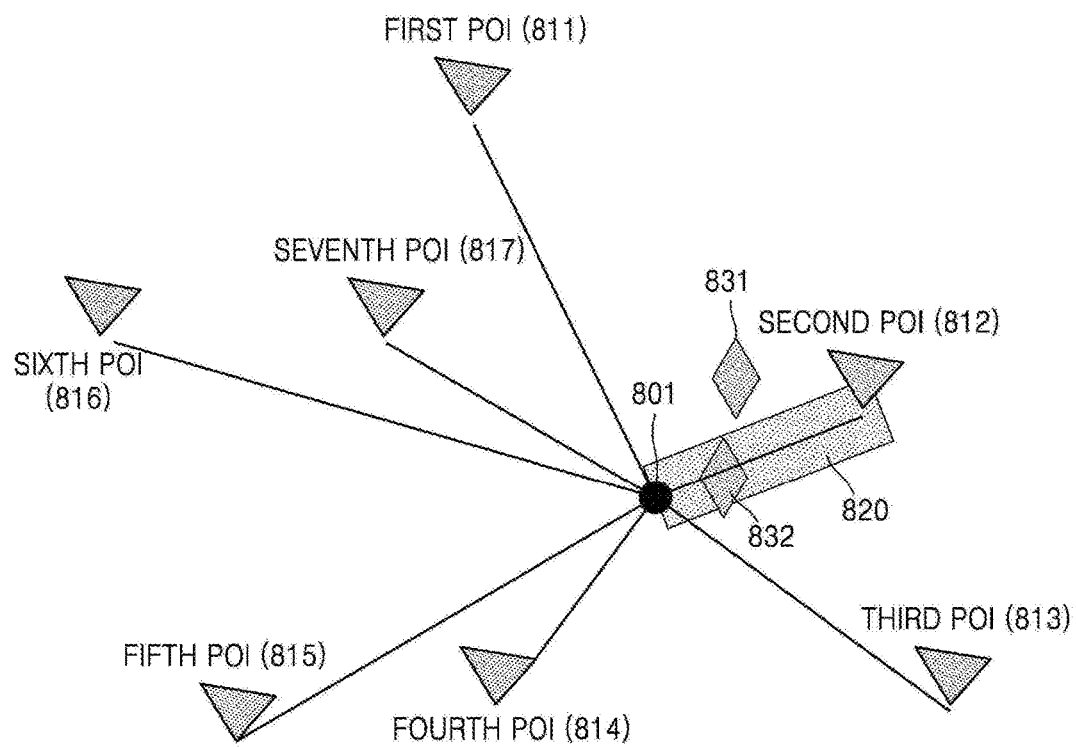
FIG. 8 illustrates an example in which a mobile device predicts a movement path of the mobile device based on point of interest (POI) information.

FIG. 8 illustrates an example in which the mobile device 10 predicts a movement path of the mobile device 10 based on POI information.

Referring to FIG. 8, the mobile device 10 may extract first to seventh POIs 811 to 817 of the mobile device 10 based on the interaction history information (600 of FIG. 6).

According to an embodiment, the second POI 812 that is the closest to a current location 801 may be predicted as a next location. Also, the mobile device 10 may obtain POI information 831 and POI information 832 of other mobile devices that are friends of the mobile device 10. Therefore, based on the POI information 831 and the POI information 832 of the other mobile devices, the mobile device 10 may obtain information regarding external devices located in the movement path of the mobile device 10.

FIG. 9 illustrates another method whereby the mobile device 10 predicts a movement path of the mobile device 10.

Referring to FIG. 9, the mobile device 10 may extract a time-interval interaction history 900 based on the interaction history information (600 of FIG. 6). For example, the time-interval interaction history 900 may include locations where interaction occurs in a certain time unit, identification information of card modules used for the interaction, and the like.

According to an embodiment, the mobile device 10 may determine a next location based on the current time. For example, when the current time is 19:30 PM, the mobile device 10 may determine B mart as a next location. Also, the mobile device 10 may obtain information regarding an external device located around a movement path from the current location to B mart.

Figure 10:
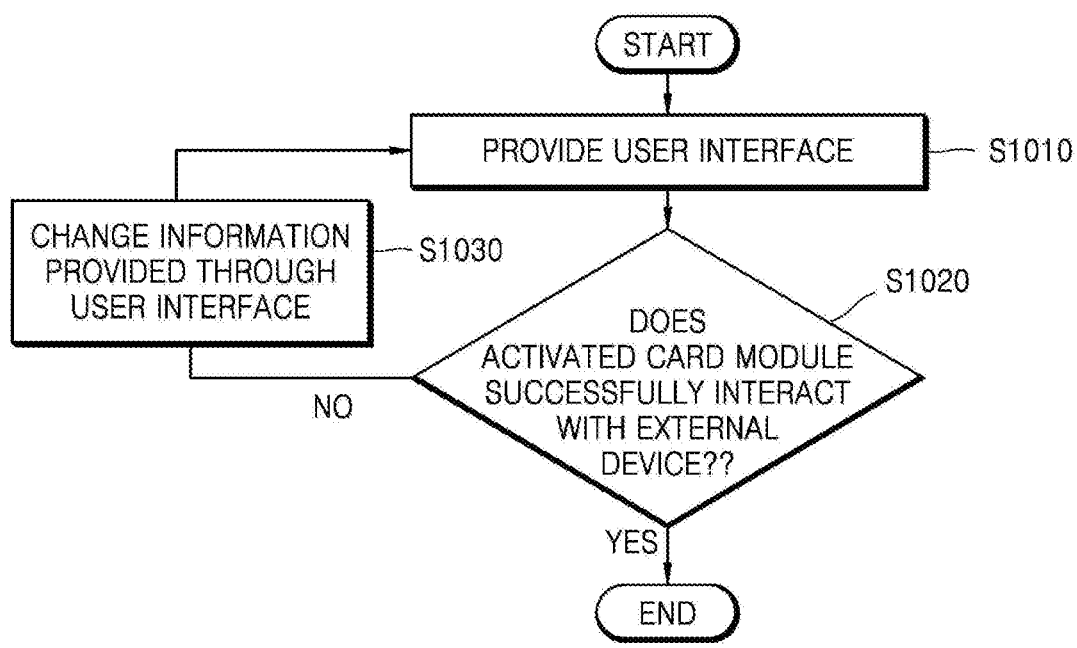
FIG. 10 is a diagram of a method whereby a mobile device provides a user interface, according to an embodiment.

FIG. 10 is a diagram of a method whereby the mobile device 10 provides a UI, according to an embodiment.

Referring to FIG. 10, in operation S1010, the mobile device 10 may provide a UI including information regarding an external device that interacts with an extracted card module. For example, the mobile device 10 may provide a UI including information regarding a type, a location, signal strength, etc. of the external device 20.

In operation S1020, the external device 20 may determine whether the interaction between the extracted card module and the external device 20 succeeds. For example, the mobile device 10 may determine whether an interaction completion signal is received from the external device 20 or the external server (e.g., the cloud server, the web server, etc.), within a certain period of time after an interaction start signal is received. When the interaction completion signal is not received within a certain period of time after the interaction start signal is received, the mobile device 10 may determine that the interaction fails.

When it is determined that the interaction fails, the mobile device 10 may change the information provided through the UI, in operation S1030.

For example, the mobile device 10 may generate a detailed user guide for guiding the mobile device 10 to the current location closer to a location and a height of the external device 20. Alternatively, the mobile device 10 may compare pieces of information regarding external devices and may provide a UI that induces the mobile device 10 to user other external devices. Alternatively, when multiple card modules are extracted, the mobile device 10 may select one of the card modules and may provide a UI indicating the selected card module.

The interaction between the external device 20 and the card module may fail because of an insufficient balance of the card module, an amount in excess of a determined credit limit (e.g., a daily spending limit, a monthly spending limit, an accumulated spending limit, etc.), and the like. In this case, the mobile device 10 may provide a UI for recharging the card module or a UI for sharing a bill with another card module. Also, the mobile device 10 may provide a UI for sharing a bill with a card module installed in a mobile device of another user. The mobile device 10 may communicate with the mobile device of the other user and may activate the card module installed in the mobile device of the other user.

Figure 11:
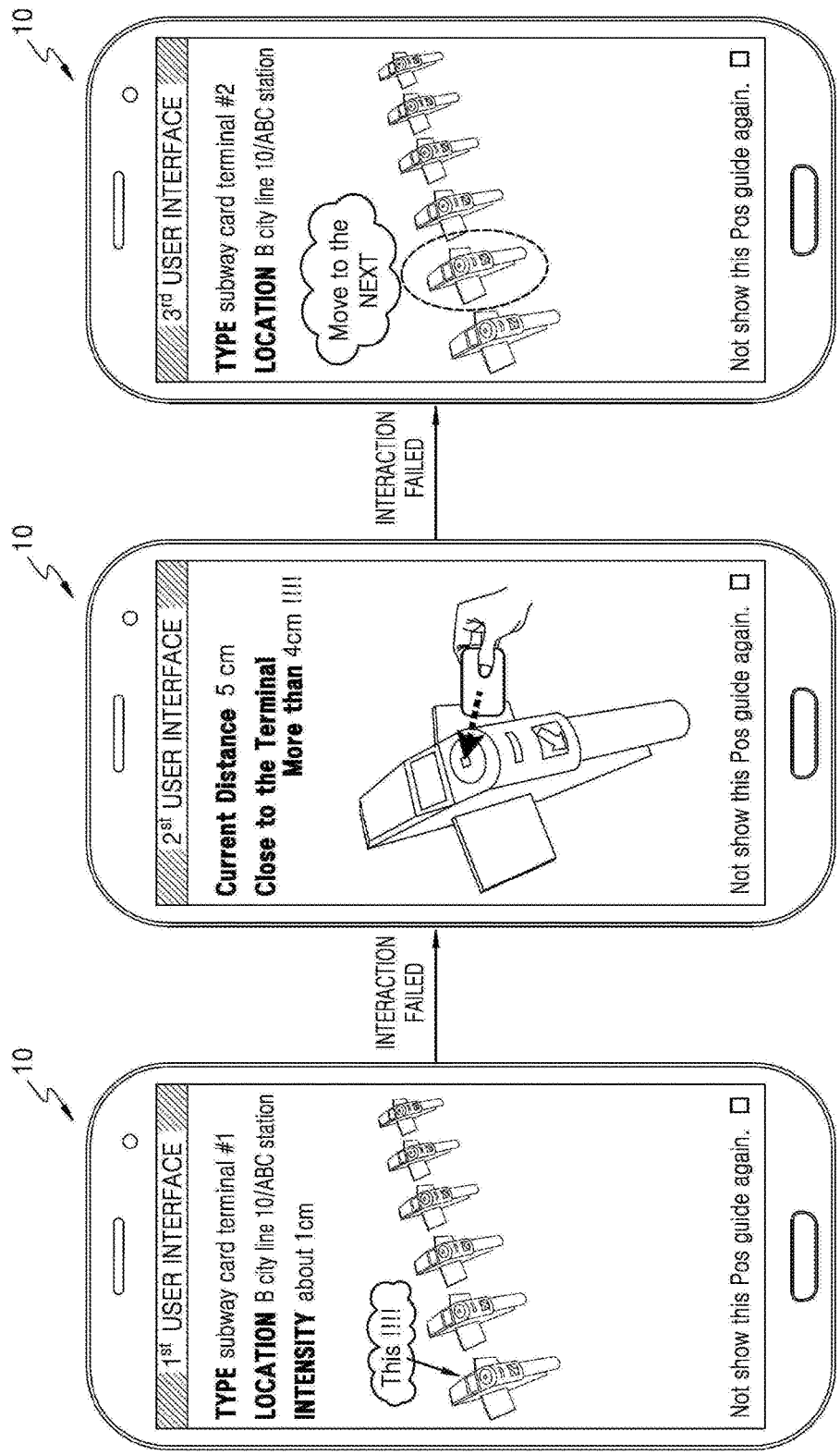
FIG. 11 illustrates an example in which a mobile device changes information provided through a user interface as interaction between a card module and an external device fails.

FIG. 11 illustrates an example in which the mobile device 10 changes information provided through a UI because interaction between a card module and an external device fails.

Referring to FIG. 11, the mobile device 10 may provide a first UI 1110 including information regarding a type, a location, and communication signal strength of a 'subway card terminal #1' that interacts with an extracted subway card module.

When the interaction fails, the mobile device 10 may provide a second UI 1120 including a user guide for guiding the mobile device 10 to a location close to a location and a height of the subway card terminal #1.

Also, when the interaction fails again, the mobile device 10 may provide a third UI 1130 indicating another external device so as to induce the user to perform interaction by using another external device (e.g., a subway card terminal #2).

Figure 12:
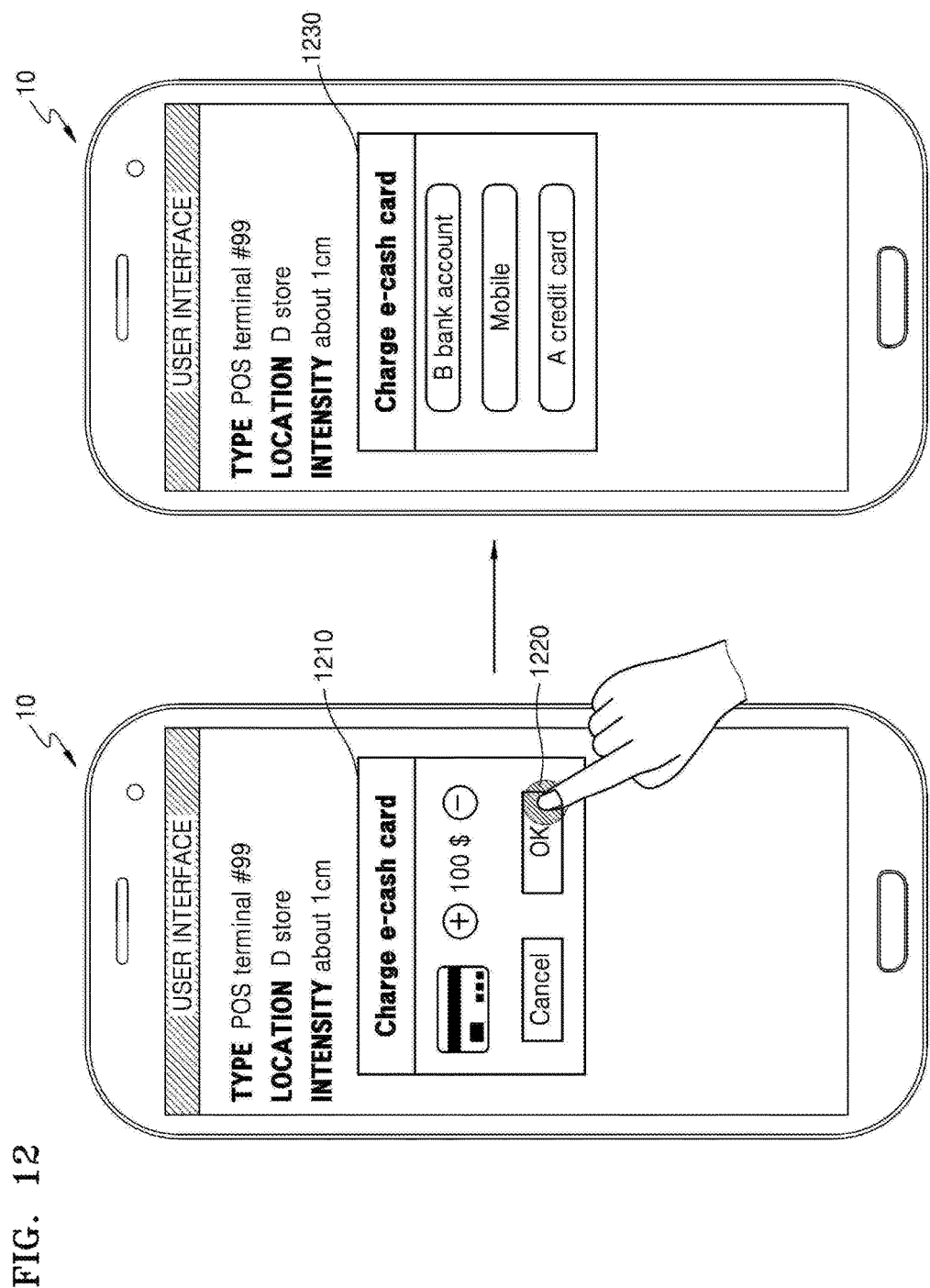
FIG. 12 illustrates an example of a user interface for recharging a cash card module.

FIG. 12 illustrates an example of a UI for recharging a cash card module.

Referring to FIG. 12, when a balance of the cash card module is insufficient, the mobile device 10 may provide a first pop-up window 1210 on which a user input 1220 of recharging the cash card module is received. Also, when a user input 1220 of recharging the cash card module is received, the mobile device 10 may provide a second pop-up window 1230 on which methods of recharging the cash card module are displayed.

Figure 13:
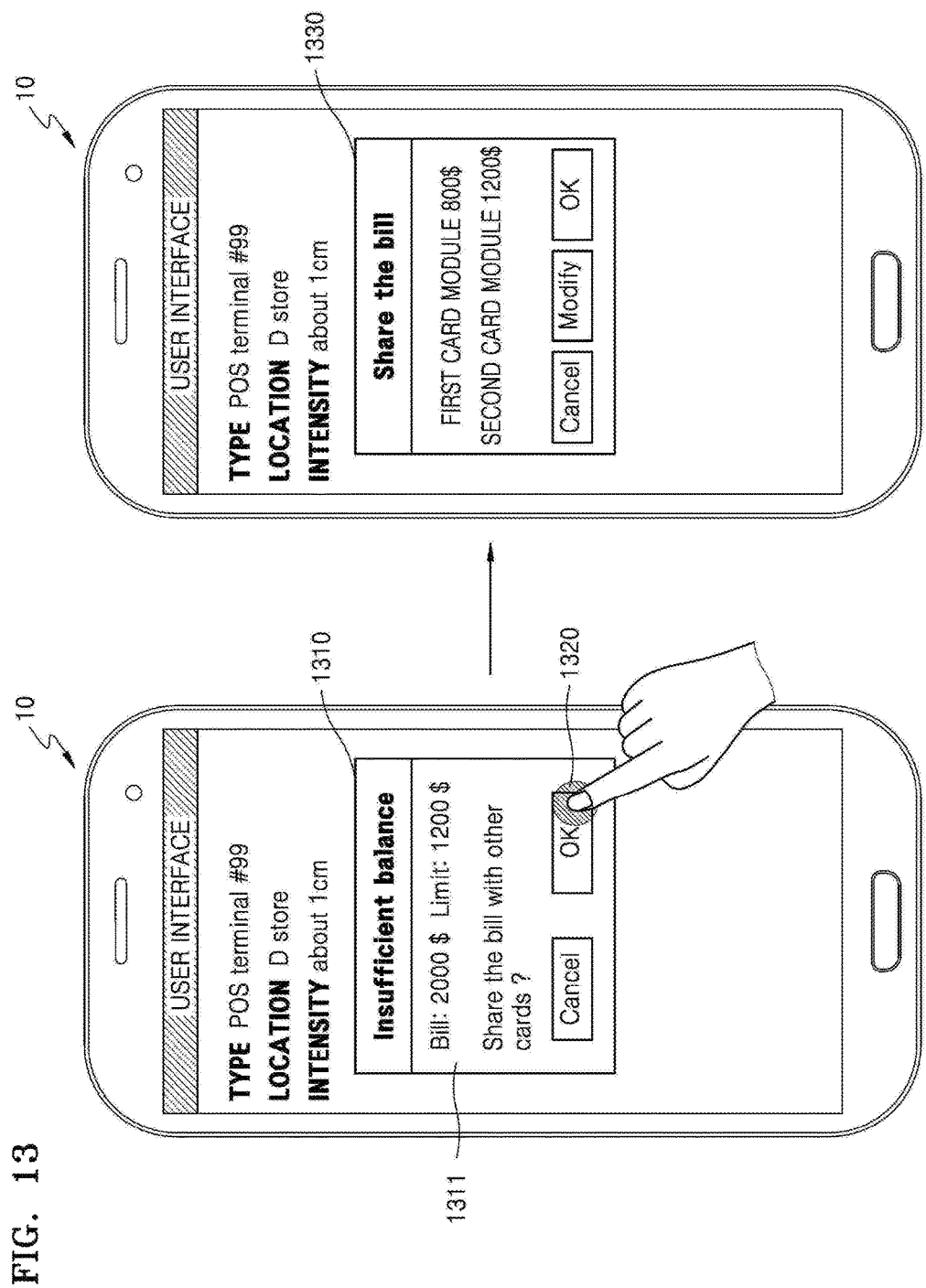
FIG. 13 illustrates an example of a user interface that shares a bill with another card module.

FIG. 13 illustrates an example of a UI for sharing a bill with another card module.

Referring to FIG. 13, when a total amount of the bill exceeds a determined credit limit, the mobile device 10 may provide a first pop-up window 1310 that includes information regarding the total amount of the bill and the determined credit limit of the card module and receives a user input 1320 of sharing the bill with another card module.

When a user input 1320 of sharing the bill with the other card module is received on the first pop-up window 1310, the mobile device 10 may provide a second pop-up window 1330 that receives a user input of determining and editing amounts charged on each card module.

Figure 14:
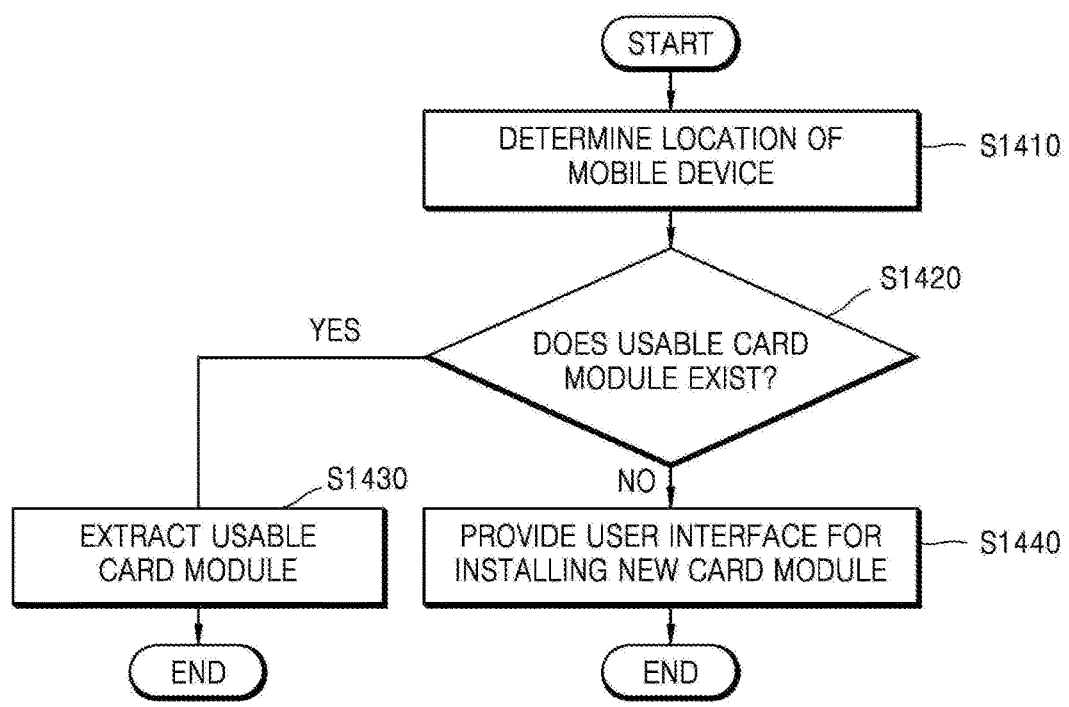
FIG. 14 is a flowchart of a method whereby a mobile device installs a new card module that may be used at a current location, according to an embodiment.

FIG. 14 is a flowchart of a method whereby the mobile device 10 installs a new card module that may be used at a current location, according to an embodiment.

Referring to FIG. 14, in operation S1410, the mobile device 10 may determine a location of the mobile device 10.

In operation S1420, the mobile device 10 may determine whether there is a card module available at the determined location.

According to an embodiment, the mobile device 10 may determine whether there is a card module available at the determined location, based on the interaction history information (600 of FIG. 6).

Alternatively, the mobile device 10 may obtain information regarding a type of the card module available at the determined location. For example, the mobile device 10 may obtain information regarding a type of a card module that may be used in stores, etc., based on information broadcasted by a beacon device in the stores, etc.

When there is an available card module, the mobile device 10 may extract the available card module in operation S1430.

When there is no available card module, the mobile device 10 may provide a UI for installing a new card module in operation S1440. For example, the mobile device 10 may provide a UI including a list of card modules that may be installed in the mobile device 10. Also, the mobile device 10 may install a new card module in response to a user input.

The list of the card modules that may be used at the location of the mobile device 10 may be obtained from an external server (e.g., a server of a store, a server of a card module provider, etc.). However, one or more embodiments are not limited thereto.

Figure 15:
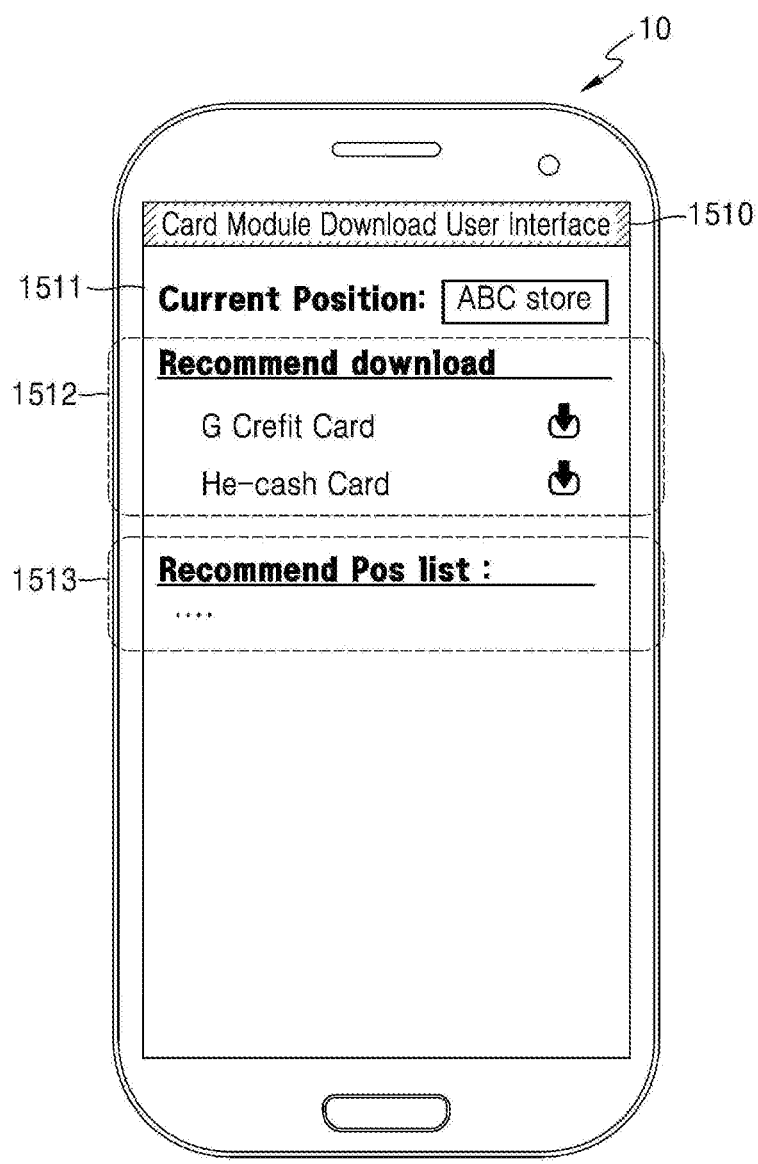
FIG. 15 illustrates an example of a user interface for installing a new card module.

FIG. 15 illustrates an example of a UI 1510 for installing a new card module.

Referring to FIG. 15, the mobile device 10 may provide the UI 1510 including location information 1511 of the mobile device 10, a list 1512 of installable card modules, and external device recommendation information 1513. The external device recommendation information 1513 may include information regarding an external device that is the closest to the mobile device 10, an external device having the greatest communication strength, an external device that is the most recently installed, or the like.

Figure 16:
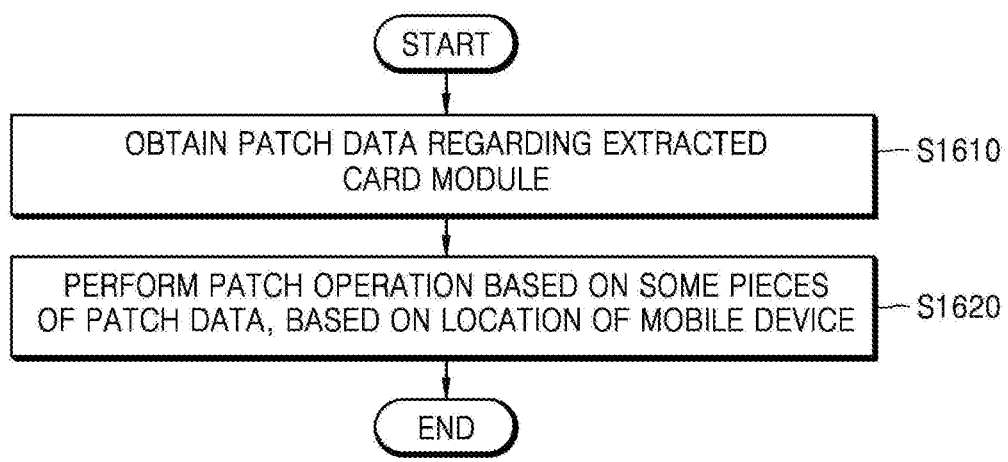
FIG. 16 is a flowchart of a method whereby a mobile device executes a patch operation, according to an embodiment.

FIG. 16 is a flowchart of a method whereby the mobile device 10 executes a patch operation, according to an embodiment.

Referring to FIG. 16, in operation S1610, the mobile device 10 may obtain patch data regarding at least one extracted card module.

According to an embodiment, the mobile device 10 may determine whether to obtain the patch data by comparing version information of patch data of a card module stored in an external server (e.g., a cloud server, a web server, etc.) with version information of a card module installed in the mobile device 10.

Also, when card modules are extracted, the mobile device 10 may provide a UI for selecting a card module, which is to execute a patch operation, from among the card modules.

In operation S1620, based on the location of the mobile device 10, the mobile device 10 may execute the patch operation by using some pieces of the patch data.

Patch data registered on the external server may be generated by considering card modules installed in different regions or devices. Therefore, the mobile device 10 may execute the patch operation by selecting some pieces of the patch data, based on the location of the mobile device 10.

For example, when the patch data includes first to fourth languages, etc., the mobile device 10 may execute the patch operation by selecting some pieces of the path data that include the first language, based on the location of the mobile device 10. The mobile device 10 may delete pieces of the patch data that are not selected.

According to an embodiment, the mobile device 10 may extract POI information of the mobile device 10, based on the interaction history information 600. The mobile device 10 may select some pieces of the patch data, based on the extracted POI information. When the POI information is spread in regions where the first and second languages are used, the mobile device 10 may execute the patch operation by selecting some pieces of the path data that include the first language and the second language.

It has been described above that some pieces of the patch data are selected based on languages. However, one or more embodiments are not limited thereto. For example, when required interaction standards differ depending on regions, the mobile device 10 may execute the patch operation by selecting only some pieces of the path data that include a certain standard.

Figure 17:
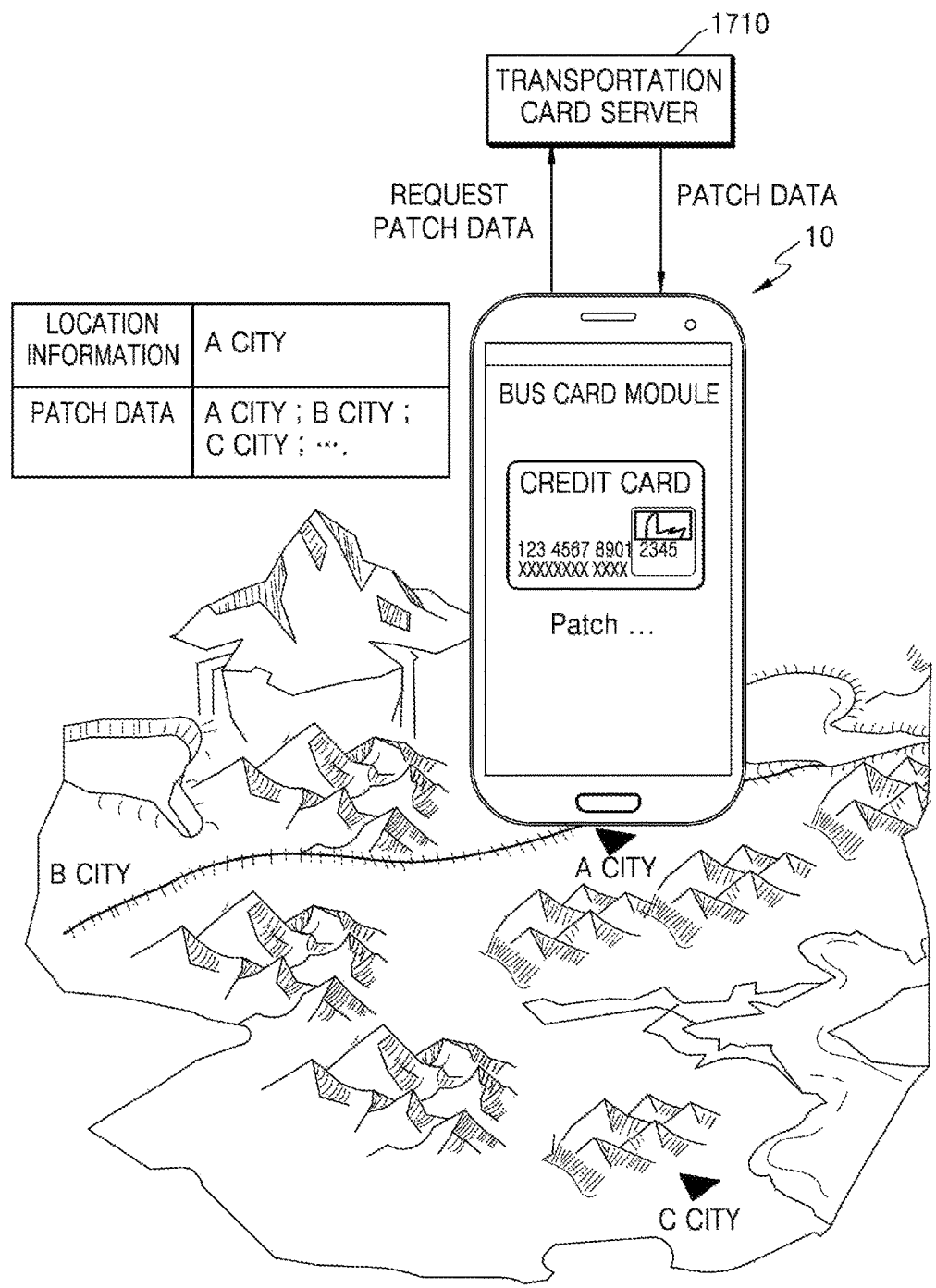
FIG. 17 illustrates an example in which a mobile device selects some pieces of patch data based on location information.

FIG. 17 illustrates an example in which the mobile device 10 selects some pieces of patch data based on location information.

Referring to FIG. 17, as a bus card module is extracted, the mobile device 10 may obtain, from a bus card server 1710, patch data that may be used in A, B, and C cities. The mobile device 10 may select some pieces of the patch data that may be used in A city, based on the location of the mobile device 10.

Also, according to an embodiment, the mobile device 10 may analyze the POI information of the mobile device 10 and may determine that the POI information is spread in the A, B, and C cities. Therefore, based on the POI information, the mobile device 10 may select some pieces of the patch data that may be used in the A, B, and C cities.

Figure 18:
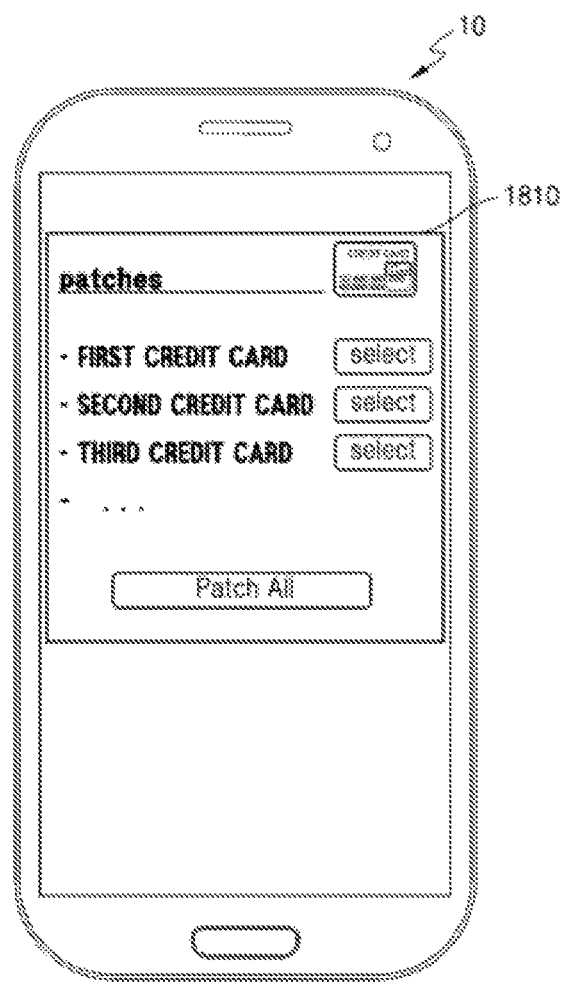
FIG. 18 illustrates an example of a user interface that selects a card module for executing a patch operation from among card modules.

FIG. 18 illustrates an example of a UI that selects a card module for executing a patch operation from among card modules.

Referring to FIG. 18, since the mobile device 10 is in a shopping mall, first to third credit card modules may be extracted. Also, the mobile device 10 may provide a UI 1810 for selecting a card module, which is to execute a patch operation, from among the first to third credit card modules.

The mobile device 10 may execute the patch operation regarding at least one card module in response to a user input regarding the UI 1810.

Figure 19:
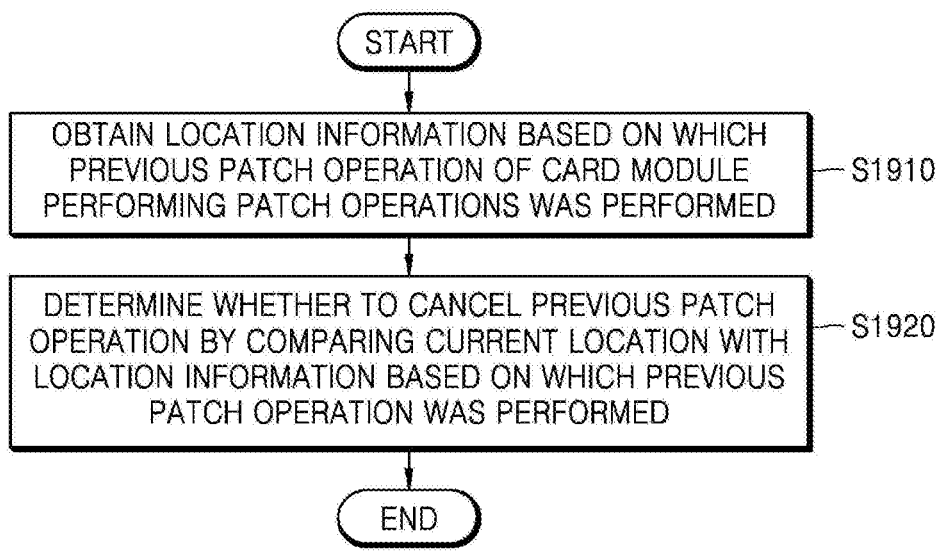
FIG. 19 is a flowchart of a method whereby a mobile device cancels a previous patch operation, according to an embodiment.

FIG. 19 is a flowchart of a method whereby the mobile device 10 cancels a previous patch operation, according to an embodiment.

Referring to FIG. 19, in operation S1910, the mobile device 10 may obtain information regarding a location where the previous patch operation of a card module for executing a patch operation is executed.

According to an embodiment, the mobile device 10 may manage a patch operation history of the card module. The patch operation history may include, for example, at least one of times when patch operations of each card module are executed, locations where the patch operations are executed, addresses of patch data used for the patch operations, and combinations thereof. The mobile device 10 may obtain the information regarding the location where the previous patch operation is executed, based on the patch operation history.

In operation S1920, the mobile device 10 may cancel the previous patch operation of the card module according to a result of comparing the current location with the information regarding the location where the previous patch operation is executed. The cancellation of the previous patch operation may mean that patch data used for the previous patch operation is removed.

For example, when the current location of the mobile device 10 is A city and the location where the previous patch operation of the card module is executed is C city, the mobile device 10 may cancel a patch operation executed in C city.

Alternatively, the mobile device 10 may provide a UI for receiving a user input of cancelling the previous patch operation of the card module.

It has been described above that the mobile device 10 determines whether to cancel the previous patch operation when the patch operation of the card module is executed. However, one or more embodiments are not limited thereto. According to an embodiment, when a free space of a memory of the mobile device 10 is less than or equal to a threshold value (e.g., 1 gigabytes (G), 256 Megabytes (M), etc.), the mobile device 10 may perform operations S1910 and S1920.

Figure 20:
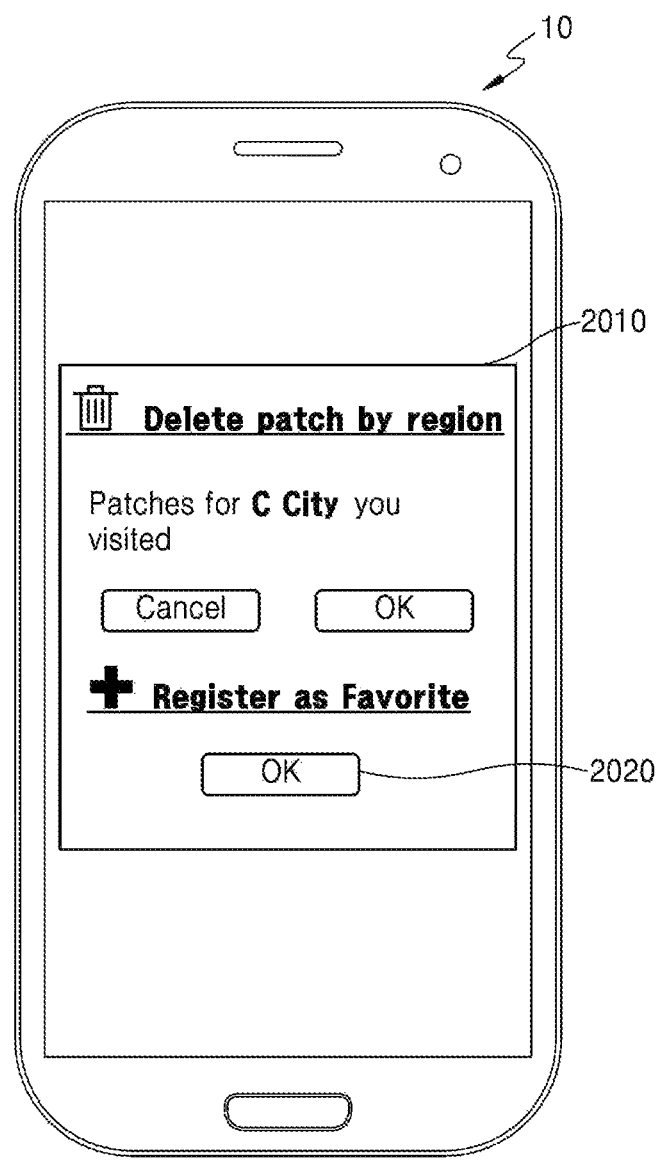
FIG. 20 illustrates a user interface that receives a user input of cancelling a previous patch operation of a card module.

FIG. 20 illustrates a UI that receives a user input of cancelling a previous patch operation of a card module.

Referring to FIG. 20, the mobile device 10 may provide a UI 2010 for cancelling the previous patch operation of the card module. The UI 2010 may further include a button image 2020 used to register a location, where the previous patch operation of the card module is executed, as a favorite region. When the location, where the previous patch operation of the card module is executed, is registered as the favorite region, the mobile device 10 may maintain the previous patch operation.

Figure 21:
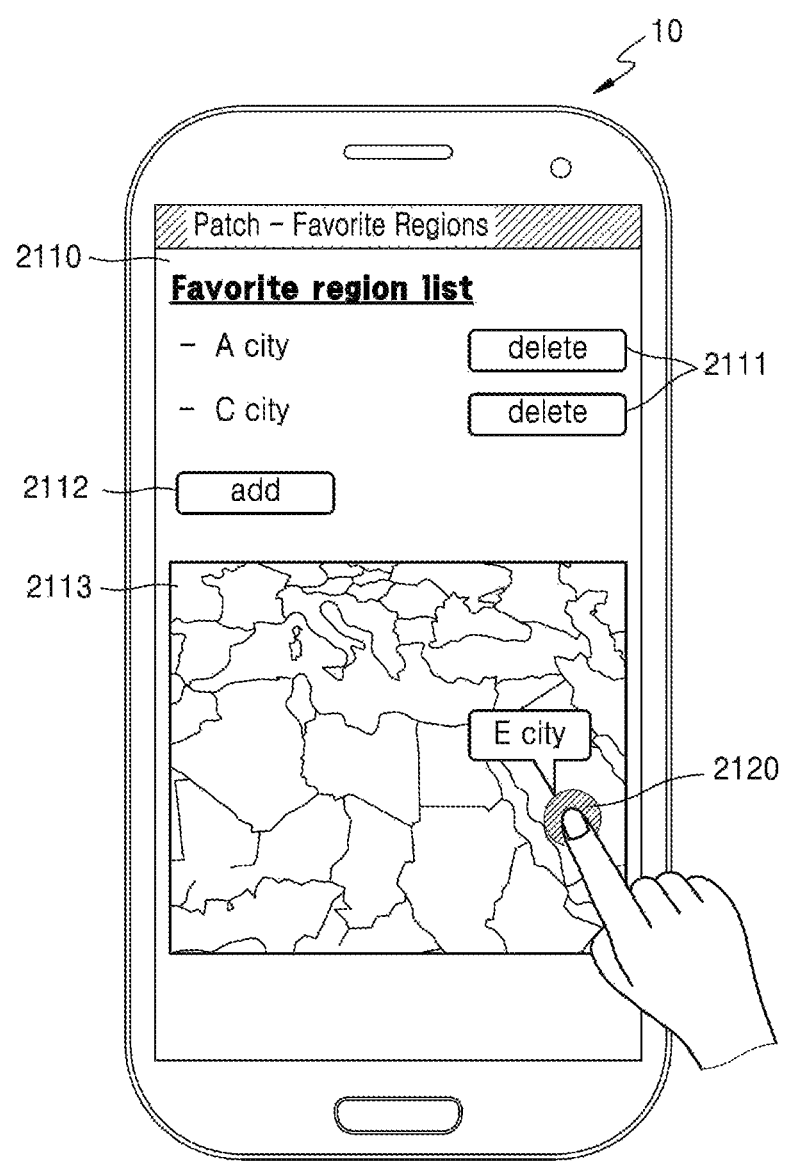
FIG. 21 illustrates an example of a user interface that manages favorite regions.

FIG. 21 illustrates an example of a UI that manages favorite regions.

Referring to FIG. 21, the mobile device 10 may provide a UI 2110 for adding and deleting the favorite regions to apply and/or delete patch data regarding a card module installed in the mobile device 10. The mobile device 10 may add or delete the favorite regions in response to a user input regarding 'delete' button images 2111 used to delete the favorite regions included in the user interface 2110, or an 'add' button image 2112 used to add favorite regions.

Also, the user interface 2110 may include a map image 2113 used to add a favorite region. The mobile device 10 may add, as a favorite region, a location (E region) corresponding to a user input (2120) received on the map image 2113.

When a patch operation regarding the card module is executed, the mobile device 10 may execute the patch operation by using patch data corresponding to a current location and the favorite region of the mobile device 10. Also, when the patch operation regarding the card module is cancelled, the mobile device 10 may not cancel a patch operation corresponding to the favorite region.

It has been described above that favorite regions are added and deleted in response to the user inputs. However, one or more embodiments are not limited thereto. According to an embodiment, when a certain region includes a POI having a value equal to or greater than a threshold value, the mobile device 10 may register the certain region as a favorite region based on the POI information extracted from the interaction history information (600 of FIG. 6).

Also, the mobile device 10 may add a favorite region based on information collected from applications installed in the mobile device 10. For example, when information, which indicates that the user will visit F region 3 days later, is collected from a schedule application, the mobile device 10 may add F region as a favorite region.

Figure 22:
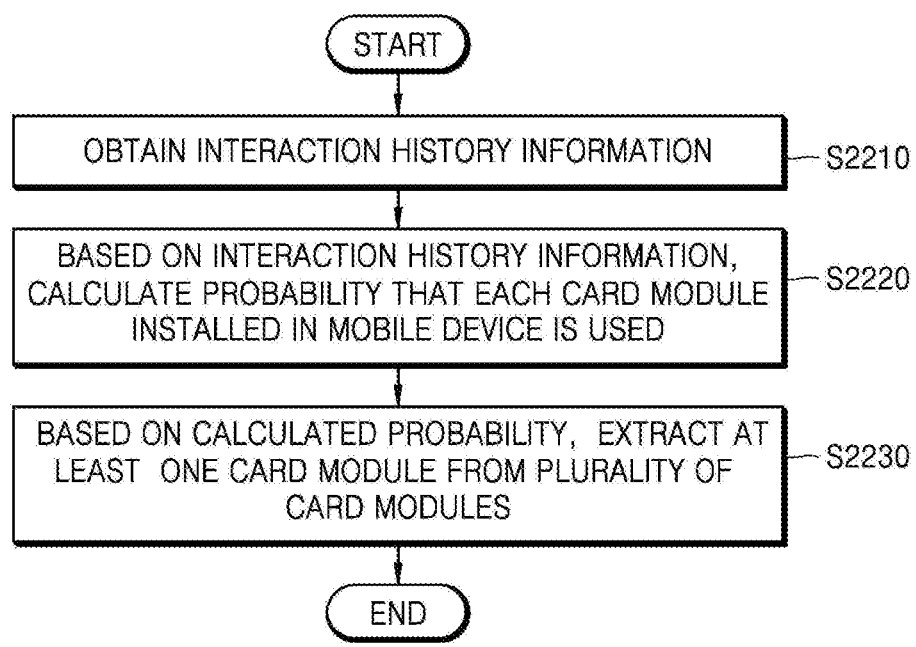
FIG. 22 is a flowchart of a method whereby a mobile device extracts at least one of card modules, based on a probability that the card modules are used, according to an embodiment.

FIG. 22 is a flowchart of a method whereby the mobile device 10 extracts at least one of card modules, based on a probability that the card modules are used, according to an embodiment.

Referring to FIG. 22, in operation S2210, the mobile device 10 may obtain interaction history information. Since operation S2210 may correspond to operation S510 of FIG. 5, detailed description of operation S2210 will be omitted.

In operation S2220, the mobile device 10 may calculate a probability that each card module installed in the mobile device 10 is used, based on the interaction history information.

According to an embodiment, the mobile device 10 may extract the time-interval interaction history (e.g., the time-interval interaction history 900 of FIG. 9) or an interaction frequency of each card module, from the interaction history information. Also, the mobile device 10 may calculate the probability that each card module is used, based on at least one of the time-interval interaction history and the interaction frequency of each card module which correspond to the location and the time of the mobile device 10.

For example, referring to FIG. 9, when the current time is 7:00 AM, the mobile device 10 may determine that the second card module may be used at a 60% probability and the third card module may be used at a 40% probability, based on the time-interval interaction history and the interaction frequency of each card module.

In operation S2230, based on the calculated probability, the mobile device 10 may extract at least one of the card modules. For example, the mobile device 10 may extract a card module having a high probability to be used, from the card modules.

Also, the mobile device 10 may provide information regarding the calculated probability and a UI indicating a card module having a high probability.

Figure 23:
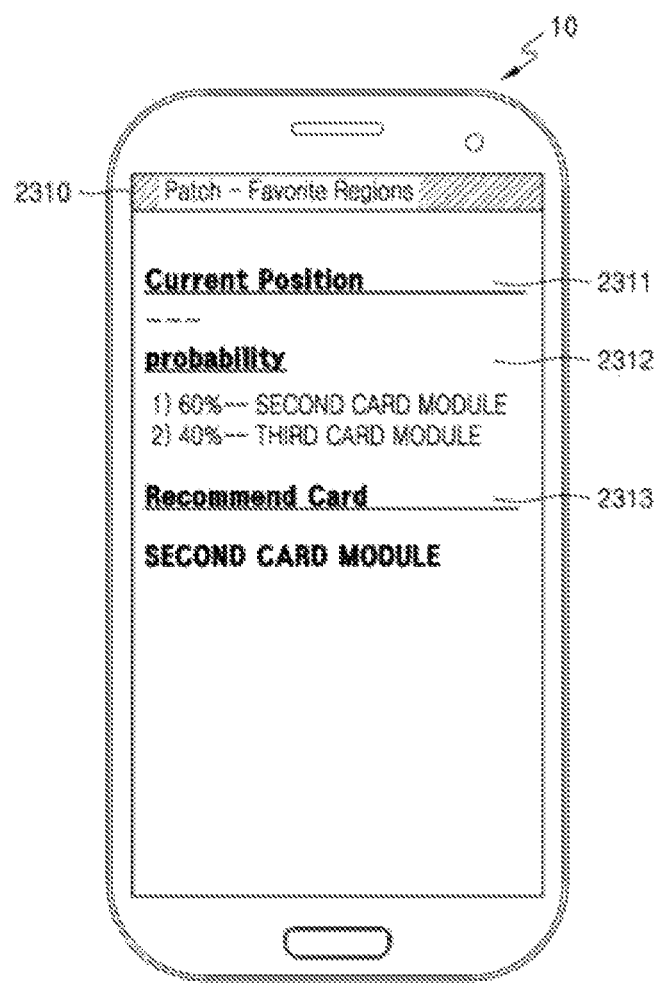
FIG. 23 illustrates an example of a user interface recommending at least one card module.

FIG. 23 illustrates an example of a UI recommending at least one card module.

Referring to FIG. 23, the mobile device 10 may extract at least one card module having a high probability to be used, based on an interaction history at the current location of the mobile device 10.

Also, the mobile device 10 may provide a UI 2310 including current location information 2311 of the mobile device 10, information 2312 regarding the extracted card module and a probability of the extracted card module, and identification information 2313 of a card module having the highest probability. The mobile device 10 may activate the card module having the highest probability by receiving a user input regarding the identification information 2313 of the card module having the highest probability.

Figure 24:
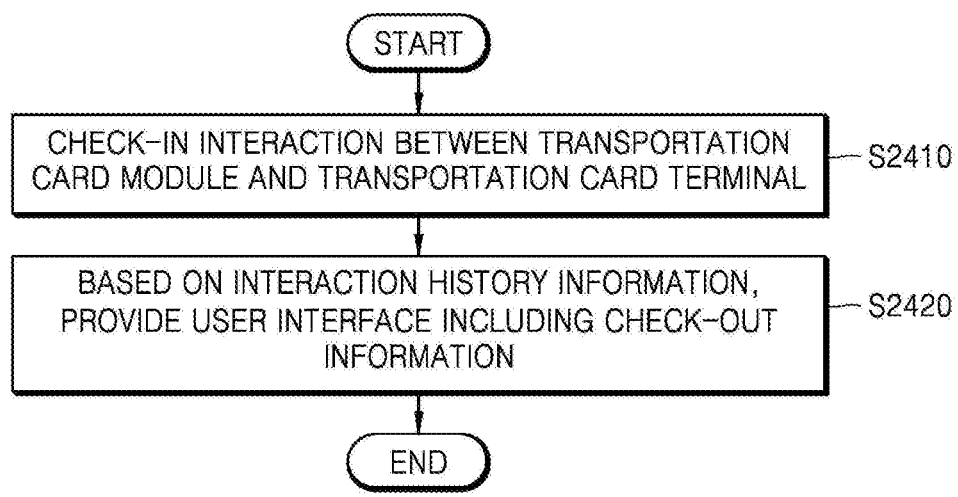
FIG. 24 is a flowchart of a method whereby a mobile device performs interaction by using a transportation card module, according to an embodiment.

FIG. 24 is a flowchart of a method whereby the mobile device 10 performs interaction by using a transportation card module, according to an embodiment.

Referring to FIG. 24, in operation S2410, the mobile device 10 may perform check-in interaction between a transportation card module and a transportation card terminal installed in the mobile device 10.

In operation S2420, the mobile device 10 may provide a UI including check-out information, based on interaction history information.

For example, based on interaction history information, the mobile device 10 may predict a check-out location and a check-out time of the transportation card. Therefore, when it is almost time to check out (e.g., a previous bus stop or before 1 minute), the mobile device 10 may provide a notification message that notifies that it is time to check out.

The mobile device 10 may further provide a UI for setting a point in time (e.g., before two stops, before 5 minutes, etc.) when the notification message is provided.

Figure 25:
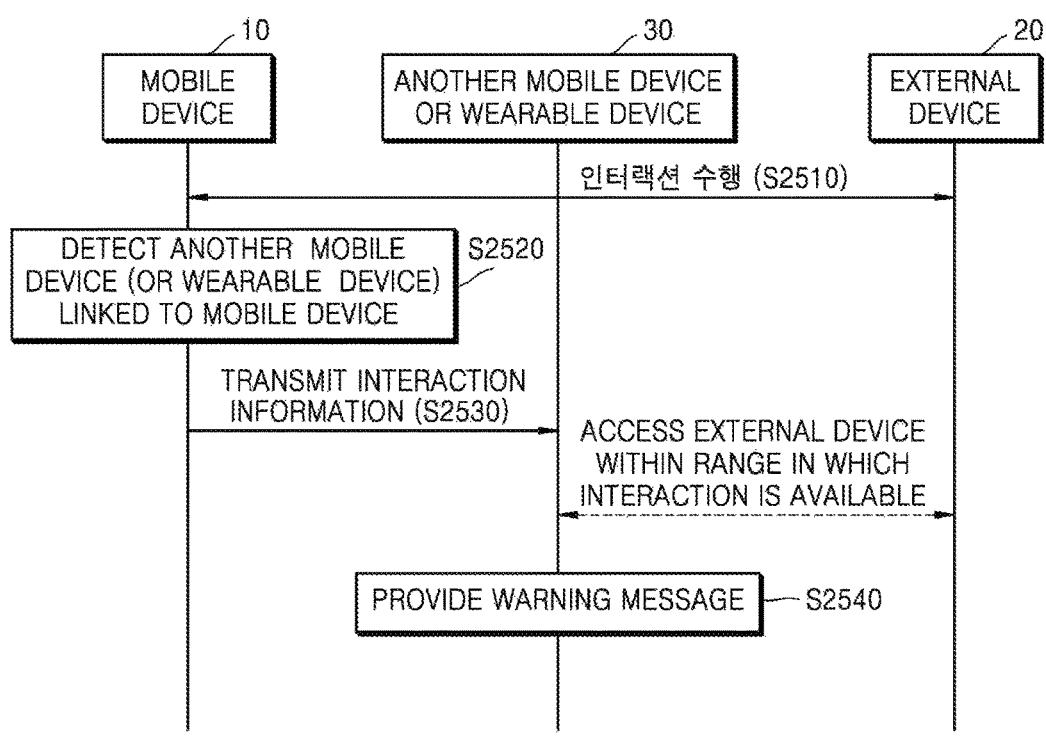
FIG. 25 is a flowchart of a method whereby a mobile device provides another mobile device with information regarding interaction with an external device, according to an embodiment.

FIG. 25 is a flowchart of a method whereby the mobile device 10 provides another mobile device with information regarding interaction with an external device, according to an embodiment.

Referring to FIG. 25, in operation S2510, the mobile device 10 may interact with the external device 20.

In operation S2520, the mobile device 10 may detect another mobile device (e.g., a wearable device) 30 connected to the mobile device 10. The other mobile device (or the wearable device) 30, which is connected to the mobile device 10, may be another mobile device or a wearable device that is set to share all or some pieces of information processed by the mobile device 10. For example, a smart watch that shares a text message received from the mobile device 10 is connected to the mobile device 10.

In operation S2530, the mobile device 10 may transmit interaction information to the other mobile device 30.

When the other mobile device 30 comes close to the external device 20 within a range in which the interaction with the external device 20 is possible, the other mobile device 30 may provide a warning message indicating that the interaction has been already performed, based on the interaction information provided from the mobile device 10, in operation S2540. In this case, the warning message may include information regarding a point in time when the interaction between the mobile device 10 and the external device 20 is performed.

Figure 26:
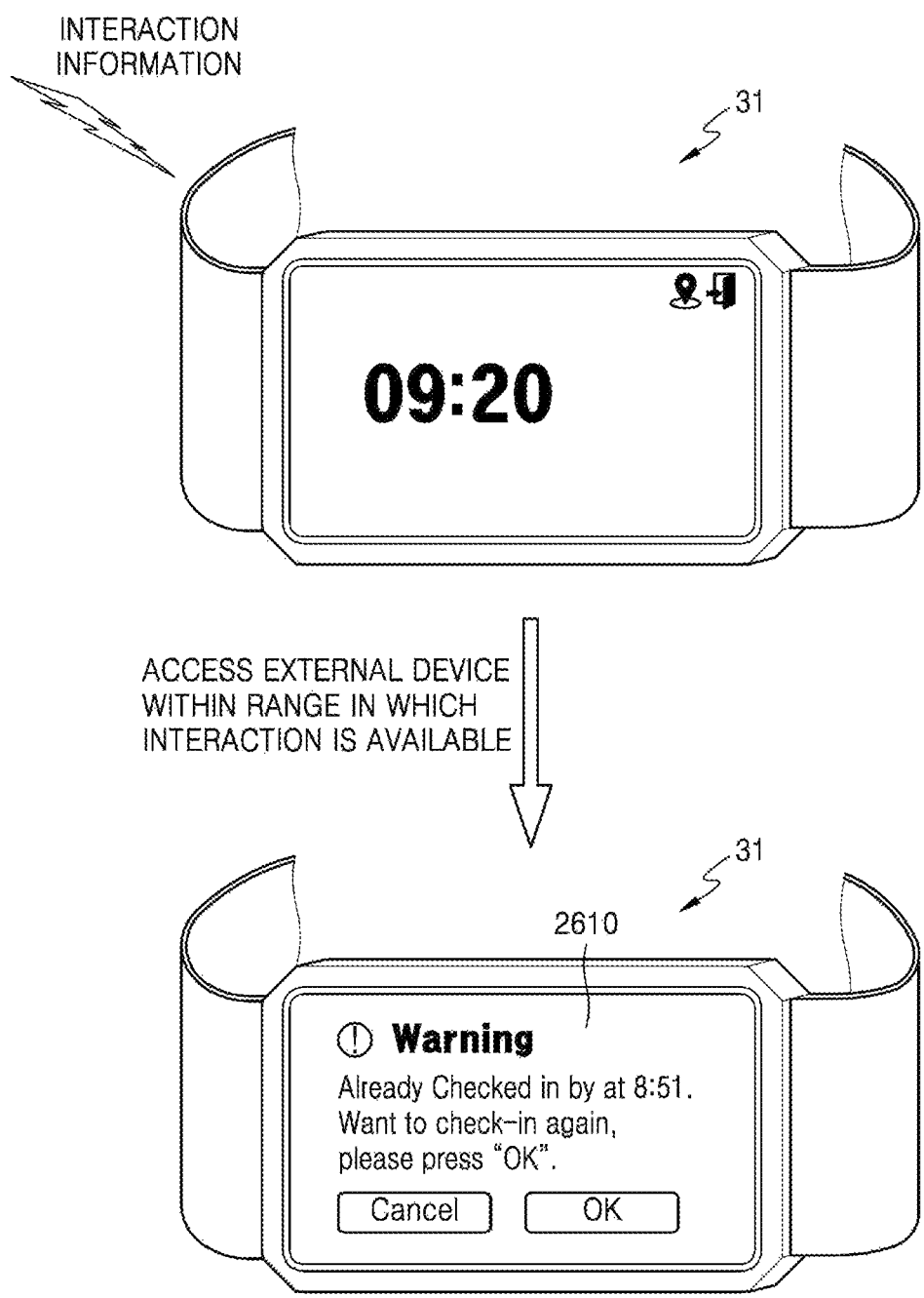
FIG. 26 illustrates an example of another mobile device that receives interaction information from a mobile device.

FIG. 26 illustrates an example of another mobile device receiving interaction information from the mobile device.

Referring to FIG. 26, a smart watch 31 connected to the mobile device 10 may receive the interaction information from the mobile device 10. Then, when the external device 20 comes close to the smart watch 31 within a range in which the interaction is possible, the smart watch 31 may provide a warning message 2610 indicating that the interaction with the external device 20 has been already performed, based on the interaction information provided from the mobile device 10.

Figure 27:
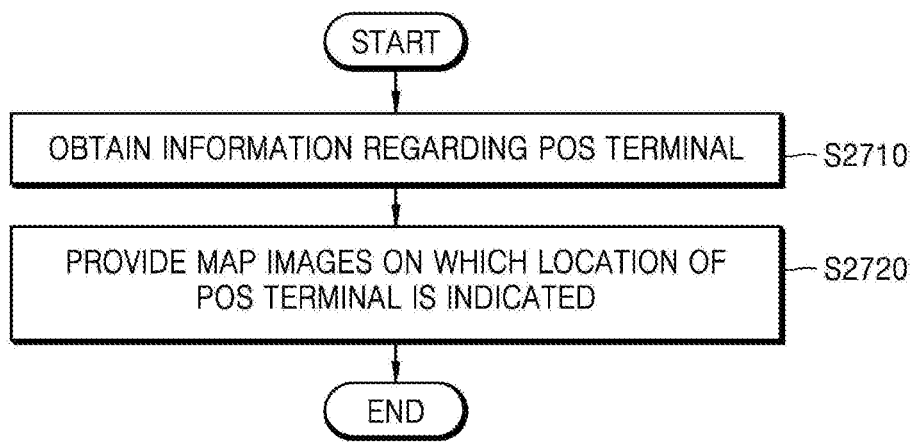
FIG. 27 is a flowchart of a method whereby a mobile device provides a map image on which a location of a point of sale (POS) terminal is indicated, according to an embodiment.

FIG. 27 is a flowchart of a method whereby the mobile device 10 provides a map image on which a location of a POS terminal is indicated.

Referring to FIG. 27, in operation S2710, the mobile device 10 may obtain information regarding the POS terminal. For example, the mobile device 10 may obtain the information regarding the POS terminal located in a vicinity of the mobile device 10 or a movement path of the mobile device 10.

According to an embodiment, based on interaction history information, the mobile device 10 may obtain the information regarding the POS terminal of which a frequency of interaction with a card module installed in the mobile device 10 is equal to or greater than a threshold value.

In operation S2720, the mobile device 10 may provide the map image on which the location of the POS terminal is indicated. In this case, the mobile device 10 may highlight and display the location of the POS terminal, of which the frequency of interaction with the card module installed in the mobile device 10 is equal to or greater than the threshold value.

According to an embodiment, when the POS terminal is portable, the mobile device 10 may track the location of the POS terminal that is moved. Also, the mobile device 10 may display the location of the tracked POS terminal on the map image.

According to an embodiment, the mobile device 10 may provide a UI that reports errors on the POS terminal.

Figure 28:
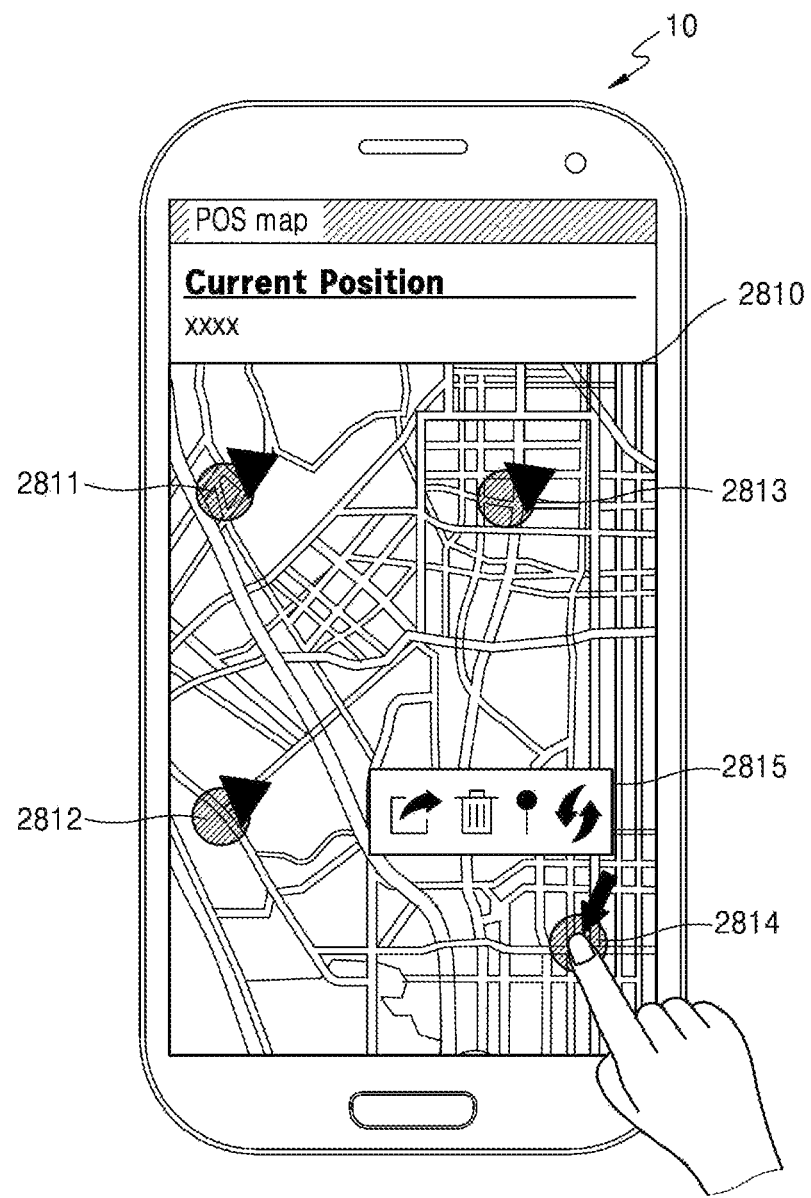
FIG. 28 illustrates an example of a map image on which locations of POS terminals are indicated.

FIG. 28 illustrates an example of a map image 2810 on which locations 2811, 2812, and 2813 of POS terminals are indicated.

Referring to FIG. 28, the mobile device 10 may provide a UI including the map image 2810 on which the locations 2811 to 2813 of the POS terminals are indicated. The mobile device 10 may highlight and display, on the map image 2810, locations 2811 to 2813 of the POS terminals of which frequencies of interaction with the card module installed in the mobile device 10 are equal to or greater than the threshold value.

Also, the mobile device 10 may perform, on the map image 2810, operations of adding a new POS terminal, deleting existing POS terminals, updating information regarding the POS terminals, and the like. For example, as illustrated in FIG. 28, the mobile device 10 may provide button images 2815 used to perform the operations of adding a new POS terminal, deleting the existing POS terminals, updating the information regarding the POS terminals, and the like, at a location of the map image 2810 where a user input 2814 is received.

Figure 29:
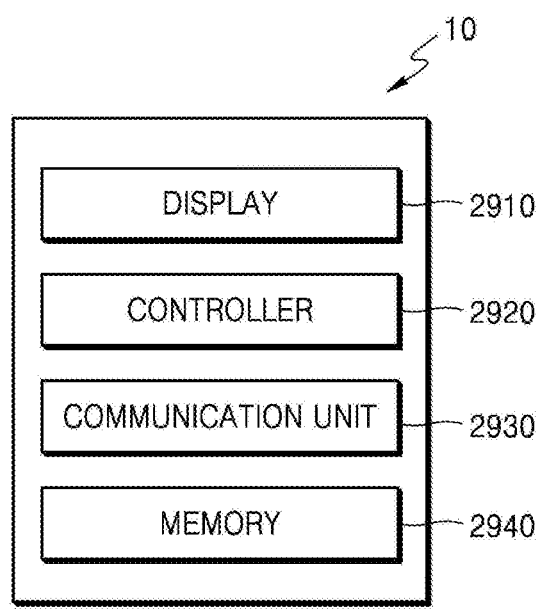
FIGS. 29 and 30 illustrate structures of mobile devices according to an embodiment.
Figure 30:
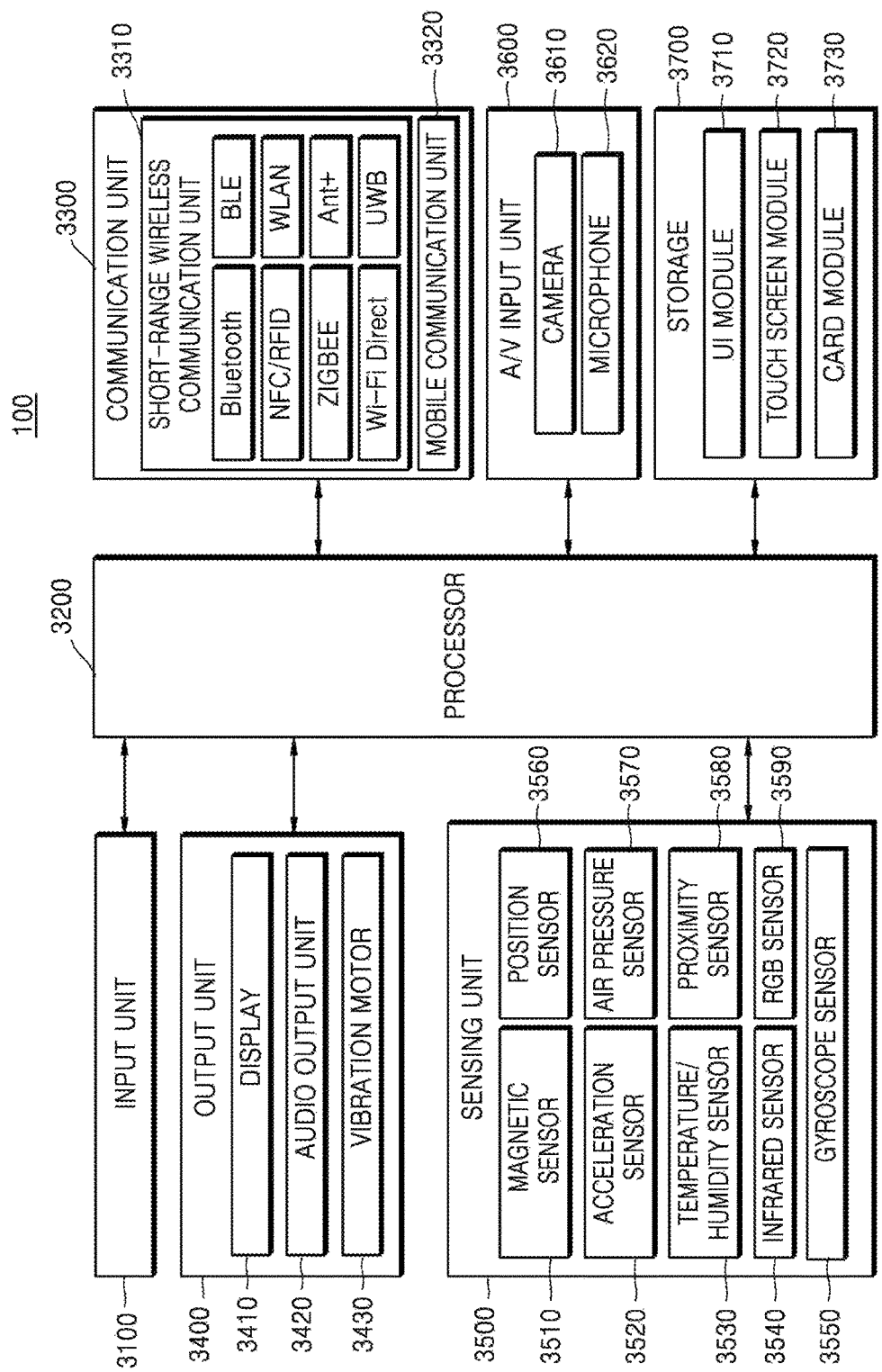

FIGS. 29 and 30 illustrate structures of mobile devices according to an embodiment.

Operations of the structures respectively illustrated in FIGS. 29 and 30 are related to the embodiments described with reference to FIGS. 1 to 28. Therefore, although omitted, the descriptions provided with reference to FIGS. 1 to 28 may be applied to the operations of the structures respectively illustrated in FIGS. 29 and 30.

As illustrated in FIG. 29, the mobile device 10 according to an embodiment may include a display 2910, a controller 2920, a communication unit 2930, and a memory 2940. However, not every component illustrated in FIG. 29 is necessary for the mobile device 10. The mobile device 10 may be embodied by using more or less components illustrated in FIG. 29.

For example, as illustrated in FIG. 30, the mobile device 10 according to an embodiment may include may further include an input unit 3100, a sensing unit 3500, and an audio/video (A/V) input unit 3600 in addition to an output unit 3400, a processor 3200, a communication unit 3300, a memory 3700 which respectively correspond to the components of FIG. 29.

The input unit 3100 may be a unit by which the user inputs data to control the mobile device 10.

According to an embodiment, in response to user inputs received from various UIs, the input unit 3100 may provide the processor 3200 with control signals corresponding to the user inputs. The user inputs may include a pressing input, a continuous pressing input, a long pressing input, a tapping input, a touching and holding input, a double tapping input, a dragging input, a panning input, a flicking input, a dragging and dropping input, a swiping input, and the like.

Also, the input unit 3100 may be a unit by which data is input by using a touch pad (e.g., a touch capacitive type touch pad, a pressure resistive type touch pad, an infrared beam sensing type touch pad, a surface acoustic wave type touch pad, an integral strain gauge type touch pad, a Piezo effect type touch pad, or the like). In addition, the input unit 3100 may further include a dome switch, a jog wheel, or the like.

The processor 3200 may generally control all operations of the mobile device 10. For example, the processor 3200 may control the input unit 3100, the communication unit 3300, the output unit 3400, the sensing unit 3500, the A/V input unit 3600, and the like by executing programs stored in the memory 3700. The processor 3200 may control the input unit 3100, the communication unit 3300, the output unit 3400, the sensing unit 3500, the A/V input unit 3600, and the like to perform the operations of the mobile device 10 descried with reference to FIGS. 1 to 28.

According to an embodiment, the processor 3200 extracts at least one of card modules stored in the processor 3200, based on a location of the mobile device 10. In this case, the location of the mobile device 10 may be obtained from a position sensor 3560 included in the mobile device 10. Also, the location of the mobile device 10 may be obtained from cell information, etc. of the mobile device 10 which is obtained through the communication unit 3300. The processor 3200 may extract at least one card module that may be used in a bank, when the mobile device 10 is the bank. Alternatively, based on a history of previous interaction occurred at a current location, the mobile device 10 may extract at least one card module.

The processor 3200 may execute a patch operation regarding the extracted card module. The processor 3200 may execute a patch operation by using only some pieces of patch data based on the location of the mobile device 10. Also, the processor 3200 may compare the location of the mobile device 10 with a location where a previous patch operation is executed, and may provide a UI for cancelling the previous patch operation of the card module.

According to an embodiment, the processor 3200 obtains information regarding at least one external device capable of interacting with at least one card module. Information regarding an external device may include identification information, a type, a location, a height, a communication type, a communicable range, communication strength, etc. of the external device.

For example, based on a type of the extracted card module, the processor 3200 may control the communication unit 3300 to obtain information provided by the external device 20 (e.g., information broadcasted from the external device 20) or obtain information regarding the external device 20 from an external server. Alternatively, based on a location, the processor 3200 may control the communication unit 3300 to obtain information regarding an external device located within a certain range (e.g., within 1 meter, within 0.5 meters, etc.) from the mobile device 10. For example, the processor 3200 may activate a short-range wireless communication unit 3310 so that the communication unit 3300 obtains information broadcasted from the outside.

Alternatively, the processor 3200 may analyze interaction history information and may obtain information regarding an external device capable of interacting with the at least one extracted card module. The interaction history information may include a point in time when the interaction between the external device 20 and the card module stored in the memory 3700 is performed, a location where the interaction is performed, identification information of the card module, information regarding the external device 20 performing the interaction, and the like.

For example, the processor 3200 may extract POI information of the user based on the interaction history information. Also, the processor 3200 may predict a movement path of the mobile device 10 by comparing locations of POIs that are close to the mobile device 10. In addition, the processor 3200 may obtain, through the communication unit 3300, information regarding external devices located around the predicted movement path. Alternatively, the processor 3200 may receive POI information of another mobile device that is a friend of the mobile device 10 and thus may obtain information regarding at least one external device 20.

According to an embodiment, the processor 3200 may provide a UI including the information regarding the external device that interacts with the at least one extracted card module. The processor 3200 may provide visual, auditory, and/or sensory UIs by controlling the output unit 3400.

For example, the processor 3200 may provide a user guide for guiding a method of interaction with the external device 20 by using the UI. Also, the processor 3200 may provide a UI including a user guide for guiding the mobile device 10 to the location closer to the location and the height of the external device 20 so that the communication unit 3300 may stably interact with the external device 20.

When information regarding external devices is received through the communication unit 3300, the processor 3200 may provide a UI that recommends one external device 20 by comparing the information.

When multiple card modules are extracted, the processor 3200 may provide a UI that distinguishes and indicates information regarding external devices capable of interacting with the card modules, respectively.

The processor 3200 may interact with the external device by using the card modules. For example, the processor 3200 may control the input unit 3100 and the communication unit 3300 to split the bill and allow the card modules to interact with the external device 20 based on the bill.

According to a result of the interaction between the extracted card modules and the external device 20, the processor 3200 may change information provided through the UI. Also, the processor 3200 may change the information provided through the UI, according to the number of times that the interaction fails. In addition, the processor 3200 may determine the information provided through the UI, according to a result of comparing each piece of information regarding the external device.

The processor 3200 may provide a UI including at least one of a credit limit, accumulated billing amounts, the number of uses, and a balance of the extracted card module.

The communication unit 3300 may include one or more components that enable communication of the mobile device 10 with at least one external device 20. For example, the communication unit 3300 may include at least one of the short-range wireless communication unit 3310, a mobile communication unit 3320, and a broadcast receiving unit.

The short-range wireless communication unit 3310 may include a Bluetooth communication unit, a BLE communication unit, an NFC unit, a WLAN communication unit, a ZigBee communication unit, an IrDA communication unit, a WFD communication unit, a UWB communication unit, an Ant+ communication unit, or the like. However, one or more embodiments are not limited thereto.

The mobile communication unit 3320 may receive/transmit wireless signals from/to at least one of a base station, an external terminal, and a server via a mobile communication network.

According to an embodiment, the communication unit 3300 may interact with the external device 20. For example, the communication unit 3300 may receive/transmit encrypted data or non-encrypted data from/to the external device 20.

The communication unit 3300 may send a request for information regarding the external device 20 to an external server and may receive the information therefrom. Also, the communication unit 3300 may receive patch data, installation data, or the like of the card module from the external server. In addition, the communication unit 3300 may transmit interaction history information of the mobile device 10 to the external server.

The output unit 3400 may output an audio signal, a video signal, or a vibration signal and may include a display 3410, an audio output unit 3420, and a vibration motor 3430.

The display 3410 may output a UI, etc. processed by the processor 3200. For example, the display 3410 may output a UI that guides a method of interaction with the external device 20, according to the control of the processor 3200. Also, the display 3410 may change and output information provided through the UI, according to the control of the processor 3200.

The display 3410 may output a notification message, a pop-up message, a configuration window, a widget, and the like, according to the control of the processor 3200.

The display 3410 may be combined with the input unit 3100 and may display a GUI provided to control the mobile device 10. For example, the display 3410 and a touch pad form a layer structure and then formed as a touch screen.

The display 3410 may include at least one of a liquid crystal display (LCD), a thin film transistor-liquid crystal display (TFT-LCD), an organic light-emitting display device, a flexible display, a 3-dimensional (3D) display, and an electrophoretic display. However, one or more embodiments are not limited thereto. Also, according to an implementation type, the mobile device 10 may include displays.

The audio output unit 3420 may output audio data received from the communication unit 3300 or stored in the memory 3700. The vibration motor 3430 may output a vibration signal.

The sensing unit 3500 may detect a state of the mobile device 10 or a state around the mobile device 10 and may transmit detected information to the processor 3200. For example, the sensing unit 3500 may include at least one of a magnetic sensor 3510, an acceleration sensor 3520, a temperature/humidity sensor 3530, an infrared sensor 3540, a gyroscope sensor 3550, a position sensor (e.g., a GPS) 3560, an air pressure sensor 3570, a proximity sensor 3580, and an RGB sensor (an illuminance sensor) 3590. However, one or more embodiments are not limited thereto.

The A/V input unit 3600 is a unit for inputting an audio signal or a video signal. The A/V input unit 3600 may include a camera 3610, a microphone 3620, and the like.

The camera 3610 may obtain image frames such as still or moving images through an image sensor in a video call mode or a shooting mode. Also, the microphone 3620 may receive an external audio signal and process the external audio signal into electrical audio data.

The memory 3700 may store programs for processes and control of the processor 3200 and may store data that is input to or output from the mobile device 10.

The memory 3700 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc.

Programs stored in the memory 3700 may be classified into a plurality of modules according to their functions, for example, into a UI module 3710, a touch screen module 3720, a card module 3730, and the like.

The UI module 3710 may support a UI provided to control the mobile device 10. The touch screen module 3720 may detect a user's touch gesture on the touch screen and may support information regarding the touch gesture. The touch screen module 3720 according to some embodiments may recognize and analyze touch codes. The touch screen module 3720 may be configured as separate hardware including a controller.

The card module 3730 may support data, etc. which is received/transmitted between the card modules and the external device 20. Also, the card module 3730 may manage installation data, patch data, etc. of each card module. For example, the card module 3730 may classify patch data according to a patch version.

One or more embodiments may be implemented as a recording medium including commands executable by a computer such as a program module. A non-transitory computer-readable recording medium may be an arbitrary medium accessible by a computer and may include volatile and non-volatile media and removable and non-removable media. Also, the non-transitory computer-readable recording medium may include a computer storage medium and a communication medium. The computer storage medium includes the volatile and non-volatile media and the removable and non-removable media that are implemented by an arbitrary method or technology for storing computer-readable commands, data structures, program modules, or information such as other data. The communication medium generally includes computer-readable commands, data structures, program modules, other data including modulated data signals such as carrier waves, or other transmission mechanisms, and includes an arbitrary information transmission medium.

The one or more embodiments are merely examples, and one of ordinary skill in the art to which the present disclosure pertains may understand that the disclosure may be embodied in many different forms without changing the spirit or essential features of the disclosure. Thus, the one or more embodiments are illustrative and non-restrictive in all aspects. For example, components that are described as a single component may be distributed, and components that are described as distributed component may be combined.

While the present disclosure has been particularly shown and described with reference to embodiments thereof, it will be understood by those of ordinary skill in the art that various changes in form and details may be made therein without departing from the spirit and scope of the present disclosure as defined by the following claims.

The invention claimed is:

1. A method of operating a mobile device, the method comprising: extracting at least one card module from a plurality of card modules installed in the mobile device, based on a location of the mobile device; obtaining information regarding at least one external device that is interactable with the at least one card module; and providing a user interface comprising the information regarding the at least one external device, wherein the user interface shows how to perform a stable interaction with the at least one external device by guiding the mobile device to a position close to a card reader of the at least one external device, and wherein the position includes a location of the at least one external device.

2. The method of claim 1, wherein the providing of the user interface comprises, when interaction between the at least one card module and the at least one external device fails, changing the information provided through the user interface.

3. The method of claim 1, wherein, when information regarding a plurality of external devices capable of interacting with the at least one card module is obtained, the providing of the user interface comprises:
selecting an external device from the plurality of external devices by comparing pieces of information respectively regarding the plurality of external devices; and
providing a user interface comprising information regarding the selected external device.

4. The method of claim 1, wherein the extracting of the at least one card module comprises:
obtaining patch data regarding the at least one card module; and
executing a patch operation by using some pieces of the patch data, based on the location of the mobile device.

5. The method of claim 4, wherein the extracting of the at least one card module further comprises cancelling a previous patch operation by comparing the location of the mobile device with a location where the previous patch operation was executed.

6. The method of claim 1, wherein the obtaining of the information regarding the at least one external device comprises:
predicting a movement path of the mobile device based on the location of the mobile device; and
obtaining the information regarding the at least one external device from the at least one external device around the movement path.

7. The method of claim 6, wherein the predicting of the movement path of the mobile device comprises:
determining a point of interest (POI) of the mobile device based on the information regarding the at least one external device; and
determining the movement path from the location of the mobile device to a closest POI.

8. The method of claim 1, wherein, when the plurality of card modules are extracted, the providing of the user interface comprises:
determining an amount paid by using each of the plurality of card modules, based on at least one of credit limits, accumulated billing amounts, a number of uses, and balances of the plurality of card modules; and
providing a user interface for displaying an amount paid by using each of the plurality of card modules.

9. The method of claim 1, wherein the information regarding the at least one external device comprises at least one of identification information, type information, and communication strength information, of the at least one external device.

10. The method of claim 1, further comprising transmitting, when interaction between the at least one card module and the at least one external device is performed, information regarding the interaction to another mobile device connected to the mobile device.

11. A mobile device comprising: a memory storing a plurality of card modules; a controller configured to extract at least one card module from the plurality of card modules, based on a location of the mobile device; and a communication unit configured to obtain information regarding at least one external device interacting with the at least one card module, wherein the controller is further configured to provide a user interface comprising the information regarding the at least one external device, wherein the user interface shows how to perform a stable interaction with the at least one external device by guiding the mobile device to a position close to a card reader of the at least one external device, and wherein the position includes a location of the at least one external device.

12. The mobile device of claim 11, wherein the controller is further configured to change information provided through the user interface, when the interaction between the at least one card module and the at least one external device fails.

13. The mobile device of claim 11, wherein, when information regarding a plurality of external devices capable of interacting with the at least one card module is obtained, the controller is further configured to select an external device from among the plurality of external devices by comparing pieces of information respectively regarding the plurality of external devices, and provide a user interface comprising information regarding the selected external device.

14. The mobile device of claim 11, wherein the controller is further configured to obtain patch data regarding the at least one card module and execute a patch operation by using some pieces of the patch data, based on the location of the mobile device.

15. A non-transitory computer-readable recording medium having recorded thereon a program for implementing the method of claim 1.

16. The mobile device of claim 11, wherein the controller is further configured to cancel a previous patch operation by comparing the location of the mobile device with a location where the previous patch operation was executed.

17. The mobile device of claim 11, wherein the controller is further configured to predict a movement path of the mobile device based on the location of the mobile device, and obtain the information regarding the at least one external device from the at least one external device around the movement path.

18. The mobile device of claim 17, wherein the controller is further configured to determine a point of interest (POI) of the mobile device based on the information regarding the at least one external device, and determine the movement path from the location of the mobile device to a closest POI.

19. The mobile device of claim 11, wherein the controller is further configured to determine an amount paid by using each of the plurality of card modules, based on at least one of credit limits, accumulated billing amounts, a number of uses, and balances of the plurality of card modules, and provide a user interface for displaying an amount paid by using each of the plurality of card modules.

20. The mobile device of claim 11, wherein the information regarding the at least one external device comprises at least one of identification information, type information, and communication strength information, of the at least one external device.

* * * * *